(12) United States Patent
Kemmochi

(10) Patent No.: US 12,294,526 B2
(45) Date of Patent: *May 6, 2025

(54) TRANSMISSION DEVICE, TRANSMISSION METHOD, AND PROGRAM

(71) Applicant: Sony Corporation, Tokyo (JP)

(72) Inventor: Chisato Kemmochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 357 days.

This patent is subject to a terminal disclaimer.

(21) Appl. No.: 17/190,357

(22) Filed: Mar. 2, 2021

(65) Prior Publication Data

US 2021/0195461 A1 Jun. 24, 2021

Related U.S. Application Data

(63) Continuation of application No. 15/564,871, filed as application No. PCT/JP2016/002110 on Apr. 20, 2016, now Pat. No. 10,959,126.

(30) Foreign Application Priority Data

Apr. 21, 2015 (JP) .................................. 2015-086481

(51) Int. Cl.
*H04L 47/30* (2022.01)
*H04J 3/06* (2006.01)
(Continued)

(52) U.S. Cl.
CPC ............. *H04L 47/30* (2013.01); *H04J 3/062* (2013.01); *H04L 47/32* (2013.01); *H04L 47/38* (2013.01);
(Continued)

(58) Field of Classification Search
None
See application file for complete search history.

(56) References Cited

U.S. PATENT DOCUMENTS

| 5,864,678 A | 1/1999 | Riddle |
|---|---|---|
| 10,959,126 B2 | 3/2021 | Kemmochi |

(Continued)

FOREIGN PATENT DOCUMENTS

| EP | 1 185 038 A2 | 3/2002 | |
|---|---|---|---|
| EP | 2424159 A1 * | 2/2012 | ............ H04L 47/10 |

(Continued)

OTHER PUBLICATIONS

International Search Report and Written opinion mailed Jul. 12, 2016 in connection with International Application No. PCT/JP2016/002110.

(Continued)

*Primary Examiner* — Yemane Mesfin
*Assistant Examiner* — Jeff Banthrongsack
(74) *Attorney, Agent, or Firm* — Wolf, Greenfield & Sacks, P.C.

(57) ABSTRACT

Techniques for wireless transmission of data are provided, in which data representing a plurality of frames of a time-sequential signal are encoded. The encoded data are temporarily retained in a memory buffer before wireless transmission. A current number of frames of the encoded data awaiting transmission is determined, and a compression rate is selected for encoding the next frame of data of the time-sequential signal based on the determined number of stored frames in the memory buffer. The selected compression rate is used to encode the next frame of the time-sequential signal, which is added to the encoded data stored in the memory buffer and wirelessly transmitted from the memory buffer. The present disclosure is applicable to a smartphone and a portable player, for example.

10 Claims, 12 Drawing Sheets

(51) Int. Cl.
  *H04L 47/32* (2022.01)
  *H04L 47/38* (2022.01)
  *H04L 65/70* (2022.01)
  *H04L 65/75* (2022.01)
  *H04W 28/02* (2009.01)
  *H04W 28/06* (2009.01)
  *H04W 84/12* (2009.01)
  *G10L 19/24* (2013.01)

(52) U.S. Cl.
  CPC .............. *H04L 65/70* (2022.05); *H04L 65/75* (2022.05); *H04L 65/762* (2022.05); *H04W 28/0278* (2013.01); *H04W 28/06* (2013.01); *G10L 19/24* (2013.01); *H04W 84/12* (2013.01)

(56) References Cited

U.S. PATENT DOCUMENTS

| | | | |
|---|---|---|---|
| 2001/0047359 A1* | 11/2001 | Videcrantz | .............. H04B 1/66 |
| 2002/0065043 A1 | 5/2002 | Hamada | |
| 2015/0189328 A1* | 7/2015 | Edlis | ...................... H04L 65/75 |
| | | | 375/240.28 |
| 2018/0091998 A1 | 3/2018 | Kemmochi | |

FOREIGN PATENT DOCUMENTS

| | | | | |
|---|---|---|---|---|
| JP | 07-170292 A | | 7/1995 | |
| JP | 2002152310 A | * | 5/2002 | ............ H04W 28/06 |
| JP | 2003-309541 A | | 10/2003 | |
| JP | 2007-519283 A | | 7/2007 | |
| JP | 2008-118326 A | | 5/2008 | |
| JP | 2012-054692 A | | 3/2012 | |
| WO | WO-03088551 A1 | * | 10/2003 | ........... H04L 1/0007 |

OTHER PUBLICATIONS

International Preliminary Report on Patentability mailed Nov. 2, 2017 in connection with International Application No. PCT/JP2016/002110.
Japanese Office Action mailed Feb. 26, 2019 in connection with Japanese Application No. 2015-086481, and English translation thereof.
Extended European Search Report dated Jul. 17, 2019 in connection with European Application No. 19163182.9.
[No Author Listed], LDAC. Sony Corporation 2019 Copyright. https://www.sony.net/Products/LDAC/ [last accessed May 14, 2019].
Xiang et al., Optimizing packet size via maximizing throughput efficiency of ARQ on bluetooth ACL data communication link. Applied Geomatics, Sep. 15, 2005.
European Communication pursuant to Article 94(3) EPC dated Feb. 25, 2021 in connection with European Application No. 19 163 182.9.
U.S. Appl. No. 15/564,871, filed Oct. 6, 2017, Kemmochi.

\* cited by examiner

TRANSMISSION DEVICE, TRANSMISSION METHOD, AND PROGRAM

CROSS REFERENCE TO RELATED APPLICATIONS

The present application claims the benefit under 35 U.S.C. § 120 as a continuation application of U.S. application Ser. No. 15/564,871, filed on Oct. 6, 2017, now U.S. Pat. No. 10,959,126, which claims the benefit under 35 U.S.C. § 371 as a U.S. National Stage Entry of International Application No. PCT/JP2016/002110, filed in the Japanese Patent Office as a Receiving Office on Apr. 20, 2016, which claims priority to Japanese Patent Application Number JP2015-086481, filed in the Japanese Patent Office on Apr. 21, 2015, each of which applications is hereby incorporated by reference in its entirety.

TECHNICAL FIELD

The present disclosure relates to a transmission device, a transmission method, and a program, and more particularly to a transmission device, a transmission method, and a program capable of realizing wireless transmission of audio data and the like without delay.

BACKGROUND ART

Bluetooth (registered trademark) is known as a standard of near field communication between digital devices. Bluetooth "Advanced Audio Distribution Profile" (A2DP) allows real-time wireless transmission of audio data reproduced by a portable music player such as a smartphone or Walkman (registered trademark of Sony Corporation), for example, to a speaker or a headphone.

However, data transmission may be delayed depending on the use environment, as a result of deterioration of communication quality or for other reasons. Delay of data transmission may cause problems such as "skipping".

For preventing skipping caused by deterioration of communication quality, there has been proposed a method which estimates communication quality on the transmission device side, and increases a compression rate of data to reduce the unit size of data transmission when communication quality deteriorates (for example, see PTL 1).

CITATION LIST

Patent Literature

[PTL 1]
JP 2003-309541 A

SUMMARY

Technical Problem

As noted above, the method described in PTL 1 may require estimation of communication quality on the transmission device side. In case of Bluetooth which determines several types of unit size of data transmission beforehand, the compression rate considerably varies when the unit size of data transmission greatly changes after switching of the unit size of data transfer. In this case, an apparent difference in sound quality is produced.

Moreover, "skipping" may be caused not only by deterioration of communication quality, but also by a heavy processing load imposed on the transmission device side, for example. In the latter case, the method described in PTL 1 is not sufficiently effective.

The present disclosure developed in consideration of the aforementioned circumstances realizes transmission of data corresponding to a reproduction target without a break of reproduction while eliminating the need for estimation of communication quality.

Solution to Problem

A transmission device according to an aspect of the present disclosure includes: an encoding unit that generates encoded data by performing an encoding process for data corresponding to a wireless transmission target to generate transmission encoded data including the encoded data of a plurality of frames and falling within a unit of transmission in a fixed size; a retaining unit that temporarily retains the transmission encoded data before wireless transmission; a transmitting unit that wirelessly transmits the transmission encoded data retained in the retaining unit; a stored frame number determining unit that determines the number of stored frames indicating the number of frames of the encoded data at the time of generation of the transmission encoded data by the encoding unit based on the number of transmission wait data indicating the number of the transmission encoded data before wireless transmission retained in the retaining unit; and a compression rate determining unit that determines the compression rate adopted in the encoding process based on the determined number of stored frames.

The transmission device according to the one aspect of the present disclosure may further include an accumulating unit that intermittently acquires and accumulates the number of transmission wait data. The stored frame number determining unit may determine the number of stored frames based on the number of transmission wait data accumulated in the accumulating unit.

The stored frame number determining unit may increase the number of stored frames when the latest number of transmission wait data accumulated in the accumulating unit exceeds a predetermined threshold. The compression rate determining unit may increase the compression rate adopted in the encoding process based on the increased number of stored frames.

The encoding unit may generate the transmission encoded data containing a mixture of the encoded data having different compression rates for each frame unit in the encoding process when the encoded data subjected to the encoding process at the compression rate before increase remains without transmission at the time of increase in the compression rate.

The stored frame number determining unit may decrease the number of stored frames when a history of the number of transmission wait data accumulated in the accumulating unit in a predetermined observation time meets a predetermined condition. The compression rate determining unit may decrease the compression rate adopted in the encoding process based on the decreased number of stored frames.

The transmission device according to the one aspect of the present disclosure may further include a penalty setting unit that sets a penalty imposed to elongate the predetermined observation time.

The penalty setting unit may set or cancel the penalty based on a switching history of the compression rate.

By a transmission method of a transmission device for wireless transmission of data according to an aspect of the present disclosure, the transmission device performs: generating encoded data by performing an encoding process for data corresponding to a wireless transmission target to generate transmission encoded data including the encoded data of a plurality of frames and falling within a unit of transmission in a fixed size; temporarily retaining the transmission encoded data before wireless transmission; wirelessly transmitting the retained transmission encoded data; determining the number of stored frames indicating the number of frames of the encoded data at the time of generation of the transmission encoded data based on the number of transmission wait data indicating the number of the retained transmission encoded data before wireless transmission; and determining the compression rate adopted in the encoding process based on the determined number of stored frames.

Under a program according to an aspect of the present disclosure, a computer functions as: an encoding unit that generates encoded data by performing an encoding process for data corresponding to a wireless transmission target to generate transmission encoded data including the encoded data of a plurality of frames and falling within a unit of transmission in a fixed size; a retaining unit that temporarily retains the transmission encoded data before wireless transmission; a transmitting unit that wirelessly transmits the transmission encoded data retained in the retaining unit; a stored frame number determining unit that determines the number of stored frames indicating the number of frames of the encoded data at the time of generation of the transmission encoded data by the encoding unit based on the number of transmission wait data indicating the number of the transmission encoded data before wireless transmission retained in the retaining unit; and a compression rate determining unit that determines the compression rate adopted in the encoding process based on the determined number of stored frames.

According to an aspect of the present disclosure, transmission encoded data before wireless transmission is temporarily retained. The number of stored frames indicating the number of frames at the time of generation of the transmission encoded data is determined based on the number of transmission wait data indicating the number of the retained transmission encoded data before wireless transmission. A compression rate adopted in an encoding process is determined based on the determined number of stored frames.

A device according to some embodiments may include a memory buffer configured to temporarily retain encoded data representing a plurality of frames of a time-sequential signal before wireless transmission of the encoded data from the device, a transmitter configured to wirelessly transmit the encoded data from the memory buffer, and control circuitry configured to: determine a current number of frames of encoded data stored in the memory buffer and awaiting transmission; select a compression rate for encoding a next frame of data of the time-sequential signal based on the determined number of stored frames in the memory buffer; encode the next frame of the time-sequential signal using the selected compression rate; and add the encoded next frame to the encoded data stored in the memory buffer for wireless transmission from the device via the transmitter.

In some embodiments, the control circuitry may be configured to intermittently determine an amount of encoded data stored in the memory buffer and determine the current number of frames of encoded data stored in the memory buffer based on the determined amount of encoded data stored in the memory buffer. In some embodiments, the control circuitry may be configured to: determine that the current number of stored frames is increased when the determined amount of encoded data stored in the memory buffer exceeds a predetermined threshold; and increase the compression rate selected for encoding the next frame based on the increased number of stored frames.

In some embodiments, the control circuitry may be configured to package the next frame encoded at the increased compression rate in a same transmission packet with a previous frame encoded at a different compression rate that has not yet been transmitted.

In some embodiments, the control circuitry may be configured to: determine that the current number of stored frames is decreased when a history of the amount of encoded data stored in the memory buffer during a predetermined observation time meets a predetermined condition; and decrease the compression rate selected for encoding the next frame based on the decreased number of stored frames.

In some embodiments, the control circuitry may be further configured to elongate the predetermined observation time based on a detected pattern of compression rate changes.

In some embodiments, the control circuitry maybe configured to set or cancel elongation of the predetermined observation time based on a switching history of the compression rate. A method for wireless transmission of data in accordance with some embodiments comprises: encoding data representing a plurality of frames of a time-sequential signal; temporarily retaining the encoded data in a memory buffer before wireless transmission of the encoded data; determining a current number of frames of encoded data stored in the memory buffer and awaiting transmission; selecting a compression rate for encoding a next frame of data of the time-sequential signal based on the determined number of stored frames in the memory buffer; encoding the next frame of the time-sequential signal using the selected compression rate; adding the encoded next frame to the encoded data stored in the memory buffer; and wirelessly transmitting the encoded data from the memory buffer.

Another type of embodiment is directed to at least one non-transitory computer-readable storage medium storing computer-executable instructions that, when executed, perform a method for wireless transmission of data, the method comprising: encoding data representing a plurality of frames of a time-sequential signal; temporarily retaining the encoded data in a memory buffer before wireless transmission of the encoded data; determining a current number of frames of encoded data stored in the memory buffer and awaiting transmission; selecting a compression rate for encoding a next frame of data of the time-sequential signal based on the determined number of stored frames in the memory buffer;
encoding the next frame of the time-sequential signal using the selected compression rate; adding the encoded next frame to the encoded data stored in the memory buffer; and wirelessly transmitting the encoded data from the memory buffer.

Advantageous Effects of Invention

According to an aspect of the present disclosure, transmission of data corresponding to a reproduction target is achievable without a break of reproduction while eliminating the need for estimation of communication quality.

DESCRIPTION OF EMBODIMENTS

Figure 1:
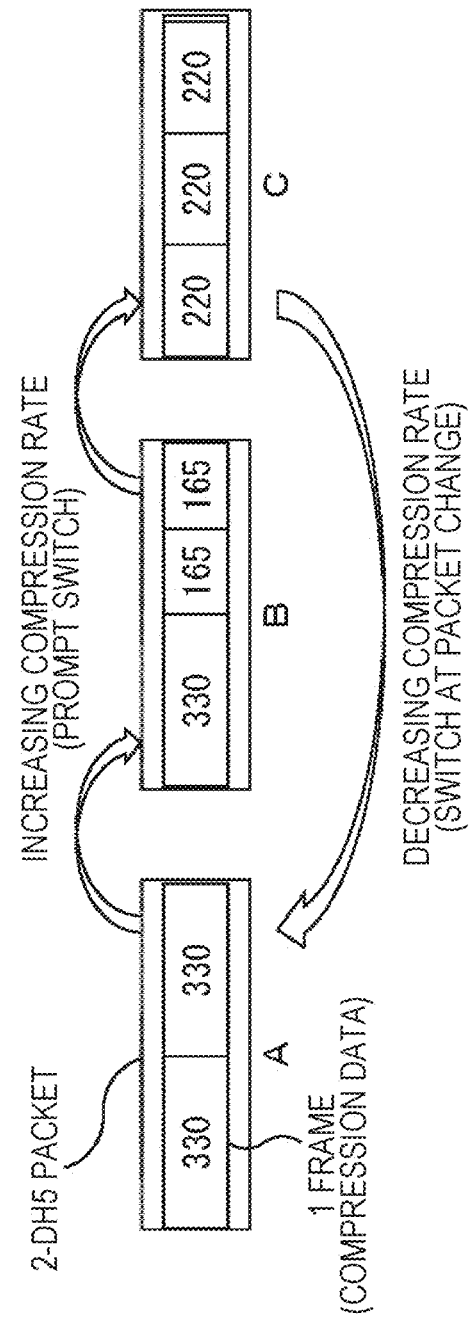
FIG. 1 is a view illustrating an outline of the present disclosure.

A best mode for carrying out the present disclosure (hereinafter referred to as embodiment) is now described in detail with reference to the drawings.

Outline of Present Disclosure

Before describing an outline of the present disclosure, terms used in the present specification are initially defined.

In the present specification, a "frame of encoded data" refers to a unit of processing in an encoding process standardized based on audio encoding system such as Advanced Audio Coding (AAC) and Adaptive TRansform Acoustic Coding (ATRAC), for example.

In the present specification, "transmission encoded data" refers to a unit of data including one or more frames and used for wireless transmission. This transmission encoded data is called transmission wait data after put into a transmission wait buffer.

In the present specification, a "unit of transmission" refers to a set of data transmitted by one wireless communication. In case of Bluetooth, for example, the unit of transmission is one packet. A unit of transmission stores a set of transmission encoded data. In the following description, a unit of transmission is referred to as a packet depending on cases.

According to an embodiment of the present disclosure, the transmission device side intermittently checks the number of transmission encoded data accumulated in the transmission wait buffer (hereinafter referred to as number of transmission wait data depending on cases) without estimating communication quality. Then, the transmission device side changes the number of frames constituting the transmission encoded data based on the checked number of transmission wait data and a history of the number of transmission wait data (change of the number of transmission wait data) without switching the unit size of transmission.

According to a system performing real-time wireless transmission of data, in general, transmission wait data is discarded from the transmission wait buffer when transmission is completed in a normal condition within a prescribed time. The prescribed time in this context refers to a time until subsequent transmission encoded data is put into the transmission wait buffer, for example.

In contrast, when transmission of transmission wait data is not completed in the normal condition, however, the corresponding transmission wait data is re-transmitted. In this case, the transmission wait data may not be completely transmitted within the prescribed time, and accumulated in the transmission wait buffer without discard of the data from the transmission wait buffer.

Possible factors for preventing completion of transmission of transmission wait data in the normal condition include not only deterioration of communication quality, but also delay of communication processing due to a heavy processing load on the transmission device even in a state of preferable communication quality. Accordingly, the method of checking the number of transmission wait data accumulated in the transmission wait buffer is also effective in the case of skipping caused by delay of data transmission resulting from a heavy processing load on the transmission device side, unlike a conventional method not effective for this case.

This point is more specifically discussed. For avoiding skipping without delay of data transmission, it is important to increase a success probability of transmission. A transmission device according the present disclosure increases a compression rate by increasing the number of frames constituting transmission encoded data without changing the size of the transmission encoded data, and thereby elongates the period for re-transmission at the time of a failure of transmission to increase the success probability of transmission. In other words, the compression rate is controlled in stages in accordance with the number of frames constituting the transmission encoded data.

Moreover, depending on the relationship between compression rate control timing and transmission encoded data break timing, there may be produced a set of transmission encoded data containing pieces of encoded data having different compression rates. In case of this type of data, the compression rate control timing is controlled in accordance with switching details of the compression rate.

For example, promptness may be required at the time of control for increasing the compression rate (increasing the number of frames constituting transmission encoded data) for prevention of skipping. In this case, transmission encoded data immediately after determination is allowed to contain a mixture of pieces of encoded data having different compression rates for each frame unit. Thereafter, the compression rate is again controlled such that each set of transmission encoded data contains only encoded data having a unified compression rate. The number of frames constituting transmission encoded data may be varied in accordance with the compression rate. When the compression rate is lower than a predetermined threshold, for example, two frames may be added at a time. In contrast, when the compression rate is lowered in accordance with decrease in transmission wait data, promptness maybe unnecessary. In this case, the number of frames constituting transmission encoded data may be reduced.

FIG. 1 illustrates a specific example of the outline of the present disclosure. In this example, a 2-DH5 packet of Bluetooth is adopted as a unit of wireless transmission of transmission encoded data. This figure does not show a header added to the 2-DH5 packet.

The 2-DH5 packet is allowed to store transmission encoded data of approximately 660 bytes for a payload of the packet. In case of the example illustrated in FIG. 1, the 2-DH5 packet stores transmission encoded data including encoded data of two frames containing 330 (=660/2) bytes per one frame as indicated in A in the figure. When it is determined in a subsequent stage that the number of packets of encoded data constituting the transmission encoded data stored in the 2-DH5 packet is to be raised to three in accordance with increase in the number of transmission wait data in the transmission wait buffer, the transmission encoded data is formed into data including both encoded data of one frame containing 330 bytes per one frame, and encoded data of two frames containing 165 (=330/2) bytes per one frame as indicated in B in the figure, on the assumption that one frame of encoded data containing 330 bytes per one frame has been already prepared at the timing of the determination.

As illustrated in C in the figure, a subsequent 2-DH5 packet corresponding to a break of the unit of transmission stores transmission encoded data including encoded data of three frames having the same compression rate. This encoded data of three frames constituting the transmission encoded data is data encoded while controlled such that the compression rate becomes 220 (=660/3) per one frame.

When it is determined in a subsequent stage that the number of frames stored in the 2-DH5 packet is to be returned to two in accordance with decrease in the number of transmission wait data in the transmission wait buffer, transmission data in the state indicated in A in the figure, i.e., transmission encoded data including encoded data of two frames containing 330 bytes per one frame is stored in a subsequent 2-DH5 packet corresponding to a break of the unit of transmission.

A success probability of transmission in the condition of transition of the compression rate as illustrated in FIG. 1 is evaluated based on an index of a re-transmission allowable time.

It is assumed herein that 3.75 milliseconds may be required for one transmission of a 2-DH5 packet, and that 2.5 milliseconds may be required for one transmission of a 2-DH3 packet (payload size: approximately 350 bytes) defined as a packet one-level lower than the 2-DH5 packet in Bluetooth. It is further assumed that a reproduction time for encoded audio data of one frame is 2.9 milliseconds.

In this case, transmission of transmission encoded data including encoded data of two frames and stored in the 2-DH5 packet is equivalent to transmission of encoded data having a reproduction time of 5.8 milliseconds in a period of 3.75 milliseconds for transmission. Accordingly, a time available for re-transmission at the time of a failure of transmission of the 2-DH5 packet is calculated as 2.05 (=5.8−3.75) milliseconds, wherefore re-transmission allowable number of times is 0.55 (≈2.05/3.75) times.

According to a similar calculation for the 2-DH3 packet, the allowable number of times of reproduction becomes 1.32 times. On the other hand, the allowable number of times of re-transmission is 1.32 times at the time of transmission of transmission encoded data including encoded data of three frames and stored in the 2-DH5 packet as in the present disclosure.

Accordingly, similar effects are produced from both the cases of lowering the packet type by one level in Bluetooth (switching from 2-DH5 packet to 2-DH3 packet), and of adding one frame to the frames constituting the transmission encoded data to be stored without changing the packet size. The re-transmission allowable time (re-transmission allowable number of times) is allowed to increase as the number of frames constituting transmission encoded data increases without a change of the packet size.

Attention is now paid to the compression rate of encoded data. When transmission encoded data including encoded data of two frames is stored in the 2-DH3 packet, 175 bytes are contained per one frame. However, when transmission encoded data including encoded data of three frames are stored in the 2-DH5 packet adopted in the normal condition in the present disclosure, 220 bytes are contained per one frame. Accordingly, the 2-DH5 packet is more advantageous (offering higher sound quality) than the 2-DH3 packet in view of sound quality.

Detailed Description of Compression Rate Control

A determination method for compression rate control is hereinafter detailed.

Compression rate control is determined based on analysis of the number of transmission wait data (number of transmission wait data accumulated in the transmission wait buffer). The number of transmission wait data is intermittently checked at such timing that transmission wait data is not accumulated in the transmission wait buffer when transmission wait data is transmitted in the normal condition.

The compression rate control may be determined based on an analysis result of the number of frames constituting transmission encoded data, in place of analysis of the number of transmission wait data.

The number of transmission wait data is recorded in an accumulated history memory including Fast In Fast Out (FIFO). The number allowed to be recorded in the accumulated history memory, i.e., the capacity of the accumulated history memory may be determined at the time of design, for example.

The determination for increasing or decreasing the compression rate may be made simultaneously with the intermittent check of the number of transmission wait data. In case of the determination for decreasing the compression rate, the compression rate is more stabilized when an observation time is elongated in accordance with the current compression rate.

For example, the determination for increasing the compression rate is made in two stages based on two types of thresholds (skipping danger threshold and transmission stability threshold) described below simultaneously with the checking operation intermittently made.

The skipping danger threshold is a threshold for the number of transmission wait data. When the number of transmission wait data exceeds the skipping danger threshold, it is determined that skipping may occur. The skipping danger threshold may be set for each compression rate. Alternatively, a multiple of stages of settings, such as for emergency and for safety, may be prepared for an identical compression rate. When the compression rate is low, for example, the re-transmission allowable time is short. In this case, a value for a prompt large reaction and a value for a prompt small reaction are prepared. When the compression rate is high, however, the re-transmission allowable time is long. In this case, a value allowing wait for a certain period may be set. The skipping danger threshold is determined beforehand at the time of design, for example. However, the skipping danger threshold may be adjusted by a user.

The transmission stability threshold is also a threshold for the number of transmission wait data. When the number of transmission wait data is the transmission stability threshold or smaller, it is determined that stable transmission is allowed even with reduction of the compression rate. The transmission stability threshold may be set in accordance with the compression rate. The transmission stability threshold is determined beforehand at the time of design, for example. However, the transmission stability threshold may be adjusted by the user.

In a first stage of the determination for increasing the compression rate, the checked number of transmission wait data is compared with the skipping danger threshold. When the number of transmission wait data exceeds the skipping danger threshold, skipping may occur. In this case, increase in the compression rate is determined. In a second stage of the determination for increasing the compression rate, a history (transition) of the number of transmission wait data is analyzed. When any of conditions established beforehand (such as gradual increase in the number of transmission wait data in a predetermined observation time, and a state that the average of the number of transmission wait data in a predetermined observation time is a predetermined threshold or larger) is met, increase in the compression rate is determined. These conditions maybe varied in accordance with the compression rate similarly to the skipping danger threshold.

The determination for decreasing the compression rate is not made until histories of the number of transmission wait data recorded in the accumulated history memory are accumulated for a predetermined observation time. After the histories of the number of transmission wait data are accumulated for the predetermined observation time, the determination for decreasing the compression rate is made based on a result of analysis for the accumulated histories. When the average of the number of transmission wait data is the transmission stability threshold or smaller, for example, it is determined that the compression rate is to be lowered. The predetermined observation time may be varied in accordance with the current compression rate.

The compression rate controlled in the foregoing manner may exhibit a continuous transition of increase and decrease. The continuous increase and decrease in the compression rate may continuously vary the sound quality. In this case, an undesirable condition generating an unpleasant sound may be given to the ears of the user. Accordingly, the transmission device proposed according to an embodiment of the present disclosure is capable of reducing skipping, and transmitting data of the highest possible quality (data having a low compression rate) while stabilizing the compression rate.

More specifically, a change pattern of the switching histories of the compression rate is observed. When the result of this observation meets predetermined conditions, the control timing for decreasing the compression rate is delayed in stages. In this case, control for decreasing the compression rate is not easily performed in an unstable environment. Accordingly, the compression rate is stabilized. However, control for increasing the compression rate at the time of prevention of skipping is promptly performed without delay.

Delay of the control timing for decreasing the compression rate in stages may be achieved by elongating the observation time for the compression rate control determination in stages. More specifically, a reference observation time may be increased twice longer or four times longer, or increased by five seconds each time, for example. The maximum observation time for delay may be arbitrarily established. For example, a reference observation time may be increased up to the maximum of sixteenth times longer, but not increased in excess of this maximum.

The change pattern of the change history of the compression rate applicable to delay of the control timing for decreasing the compression rate is defined for the purpose of stabilization of the compression rate. Accordingly, following two types of change patterns (first and second change patterns) are adoptable, for example. However, change patterns not presented herein may be adopted.

The first change pattern corresponds to a case when the compression rate is increased immediately after decrease in the compression rate. When the first change pattern is produced, sound quality continuously changes. This condition may generate an unpleasant sound for the ears of the user.

The second change pattern corresponds to a case when the compression rate is continuously increased. When the second change pattern is produced, it is estimated that a transmission situation is becoming severer. In this case, it is preferable that the compression rate is stabilized rather than decreased.

Concerning the timing for canceling delay of the control timing, adoptable methods are a method for reducing the delay time by one level when the compression rate is stabilized for a certain period without increase after decrease in the compression rate by one level or more with respect to the compression rate at the time of setting of delay, and a method for canceling delay when the compression rate is stabilized for a certain period without increase after decrease in the compression rate by two levels with respect to the compression rate at the setting of delay, for example.

Example of Respective Parameters

Figure 2:
FIG. 2 is a view illustrating an example of respective parameters.

FIG. 2 is a view showing an example of respective parameters adopted by the transmission device according to an embodiment of the present disclosure. As illustrated in the figure, six levels from ID=0 to ID=5 are set for the compression rate. The compression rate ID=0 indicates the lowest compression rate, while the compression rate ID=5 indicates the highest compression rate.

The number of stored frames indicates the number of frames of encoded data stored in one packet, more accurately, the number of frames of encoded data constituting transmission encoded data stored in one packet. For example, the number of stored frames at the compression rate ID=1 is 3, while the number of stored frames at the compression rate ID=5 is 7.

Two types of skipping danger thresholds for emergency and safety are determined for each of the compression rate ID=0 and ID=1, while one type of skipping danger threshold is established for each of the compression rates ID=2 through ID=5. For example, the skipping danger threshold for emergency at the compression rate ID=0 is 6, while the skipping danger threshold for safety at that compression rate is 3. On the other hand, the skipping danger threshold for each of the compression rates of ID=2 through ID=5 is 6, for example.

The number of increased frames indicates the packet addition number at the time of increase in the number of frames stored in one packet (number of frames of encoded data constituting transmission encoded data stored in one packet) in response to an excess of the number of transmission encoded data from the skipping danger threshold. When the number of transmission wait data exceeds the skipping danger threshold for emergency (=6) at the current compression rate ID=0, 2 is added to the number of stored frames currently set to 2 based on the number of increased frames set to 2. As a result, 4 is obtained as the number of stored frames. In this case, the compression rate is switched to the compression rate ID=2 in correspondence with the number of stored frames (=4). When the number of transmission wait data exceeds the skipping danger threshold (=6) at the current compression rate ID=2, for example, 1 is added to the current number of stored frames (=4) based on the number of increased frames set to 1. As a result, 5 is obtained as the number of stored frames. In this case, the compression rate is switched to ID=3 in correspondence with the number of stored frames (=5).

A compression rate decrease observation time indicates an observation time necessary for determining decrease in the compression rate. For example, the observation time at the compression rate ID=1 is set to 5 seconds. In this case, determination of whether or not the compression rate is to be decreased is made after the histories of the number of transmission wait data are accumulated for 5 seconds in the accumulated history memory.

The compression rate decrease observation time is elongated by multiplication of a coefficient corresponding to a penalty value. The penalty value is normally set to a once larger penalty. However, the penalty value is sequentially increased to twice larger, $2^2$ times larger, $2^3$ times larger, and up to $2^4$ times larger every time the change history of the compression rate becomes applicable to the first or second change pattern described above. For example, the compression decrease observation time is set to 10 (=5×2) seconds at the current compression rate ID=1 and a penalty of twice larger.

The penalty is canceled when the compression rate does not increase for a predetermined period after decrease in the compression rate by two levels from the compression rate ID at the time of setting of the penalty (hereinafter referred to as penalty compression rate ID), for example. When the compression rate ID two-level lower than the penalty compression rate ID is absent, the penalty is canceled in a state that a transmission stable condition count variable (described below) is a default value or larger.

The penalty value corresponding to a coefficient for the compression rate decrease observation time is not limited to a power of 2, but may be arbitrarily determined. It is further allowed that the value of the penalty is added to the compression rate decrease observation time as an addition value, rather than used as the multiplication coefficient for the compression rate decrease observation time. In this case, the value of the penalty used for calculation may be 5, 10, 15, and 20, for example. Needless to say, the addition value for the penalty is not limited to a multiple of 5, but may be arbitrarily determined.

Configuration Example of Transmission Device According to Present Disclosure

Figure 3:
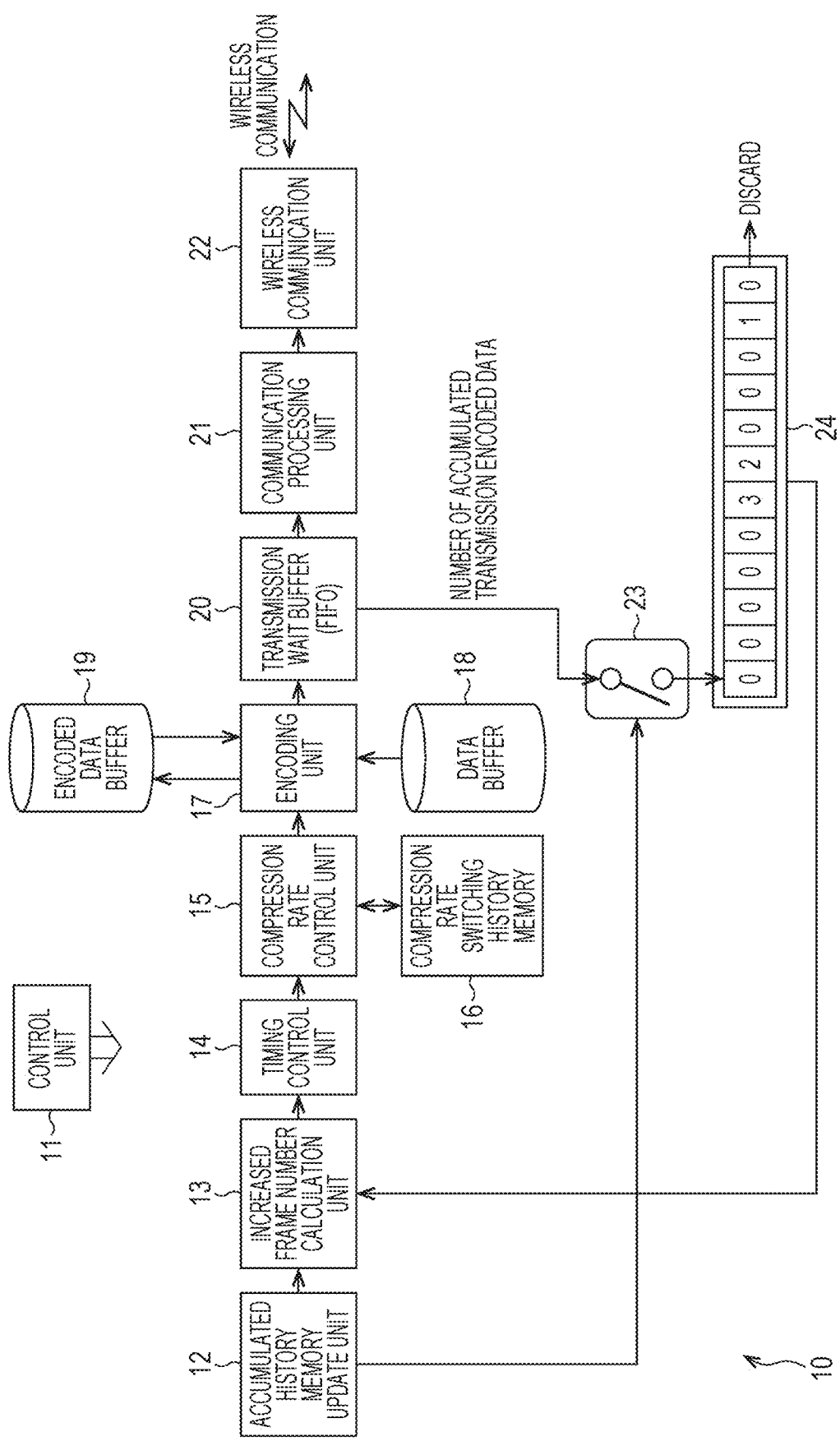
FIG. 3 is a block diagram illustrating a configuration example of a transmission device according to an embodiment of the present disclosure.

FIG. 3 illustrates a configuration example of a transmission device according to an embodiment of the present disclosure. A transmission device 10 performs an encoding process for data corresponding to a target of wireless transmission, generates transmission encoded data from encoded data obtained by the encoding process in units of a frame, and wirelessly transmits the packetized transmission encoded data. The transmission device 10 controls the compression rate in the encoding process in the manner described above. It is assumed herein that data corresponding to a wireless transmission target is audio data according to this embodiment. However, the transmission device 10 is applicable to wireless transmission of other types of data such as video data.

The transmission device 10 includes a control unit 11, an accumulated history memory update unit 12, an increased frame number calculation unit 13, a timing control unit 14, a compression rate control unit 15, and a compression rate switching history memory 16. The transmission device 10 further includes an encoding unit 17, a data buffer 18, an encoded data buffer 19, a transmission wait buffer 20, a communication processing unit 21, a wireless communication unit 22, a switch 23, and an accumulated history memory 24.

The control unit 11 controls operations of respective constituent elements of the transmission device 10 noted above. More specifically, the control unit 11 performs a data transmission process described below at intervals of a fixed cycle of 20 milliseconds, for example.

The accumulated history memory update unit 12 turns on or off the switch 23 under control by the control unit 11 to record the number of transmission wait data (number of transmission wait data accumulated in the transmission wait buffer 20) in the accumulated history memory 24.

The increased frame number calculation unit 13 obtains and analyzes values recorded in the accumulated history memory 24 (number of transmission wait data), and notifies the timing control unit 14 about the number of increased frames set in accordance with the analysis result.

The number of increased frames is set initially based on comparison between the number of transmission wait data and the skipping danger threshold, for example. More specifically, it is determined whether or not the latest value recorded in the accumulated history memory 24 exceeds the skipping danger threshold corresponding to the current compression rate. When the determination result is true, the timing control unit 14 is notified about the number of increased frames corresponding to the current compression rate illustrated in FIG. 2. When the latest value recorded in the accumulated history memory 24 is 7 at the current compression rate ID=0, for example, this value recorded in the accumulated history memory 24 exceeds the skipping danger threshold (=6). In this case, 2 is obtained as the number of increased frames.

When the latest value recorded in the accumulated history memory 24 does not exceed the skipping danger threshold corresponding to the current compression rate, it is determined how a fluctuation tendency of the number of transmission wait data is like. More specifically, the values recorded in the accumulated history memory 24 are analyzed to determine whether or not the number of transmission wait data tends to gradually increase. For example, when the latest value of the number of transmission wait data is larger than the previous value, and exceeds a predetermined threshold (such as 4), the determination result is true. When these conditions are not met, the determination result is false.

When the determination result is true, the increased frame number calculation unit 13 calculates the number of increased frames, and notifies the timing control unit 14 about the calculated number. When the determination result is false, the increased frame number calculation unit 13 checks whether or not records for a predetermined observation time (such as 500 milliseconds) have been accumulated in the accumulated history memory 24. When records for the predetermined observation time are not accumulated, the number of increased frames is set to 0 and given to the timing control unit 14 as a notification. When records for the predetermined observation time are accumulated, the number of increased frames is calculated based on the accumulated values, and given to the timing control unit 14 as a notification.

When the average of the number of transmission wait data accumulated in the accumulated history memory 24 is a predetermined threshold (such as 1.5) used for determination for increasing the compression rate or exceeds this threshold, for example, the number of increased frames for increasing the compression rate is calculated, and given to the timing control unit 14 as a notification. When the average of the number of transmission wait data accumulated in the accumulated history memory 24 is 0 or smaller than the transmission stability threshold, the number of increased frames for decreasing the compression rate is calculated, and given to the timing control unit 14 as a notification. When the average of the number of transmission wait data accumulated in the accumulated history memory 24 is not the predetermined threshold (such as 1.5) or larger, is not 0, and is not smaller than the transmission stability threshold, the number of increased frames not switching the compression rate (such as −99) is given to the timing control unit 14 as a notification.

When the number of increased frames given from the increased frame number calculation unit 13 is a value for decreasing the compression rate, the timing control unit 14 determines whether or not this value has continued for a compression rate decrease observation time reflecting a penalty. When the current compression ID is 1, for example, the observation time becomes 5 seconds in a state of a once larger penalty. Determination for decreasing the compression rate is made for every 500 milliseconds. Accordingly, the determination result is regarded as true when a notification of the number of increased frames for decreasing the compression rate is continuously given ten times from the increased frame number calculation unit 13. When the determination result is false, the accumulated history memory 24 is cleared. In this case, the timing control unit 14 switches the number of increased frames to 0 and notifies the compression rate control unit 15 about this value.

When the notification of the number of increased frames given from the increased frame number calculation unit 13 is a value not switching the compression rate (such as −99), the timing control unit 14, which has received continuous notifications each showing the number of increased frames for decreasing the compression rate given from the increased frame number calculation unit 13, initializes the number of these continuous notifications to 0. Then, the timing control unit 14 switches the number of increased frames to 0 and notifies the compression rate control unit 15 about this number.

When the number of the increased frames given from the increased frame number calculation unit 13 is 0 or a value for increasing the compression rate, the timing control unit 14 notifies the compression rate control unit 15 about the number of increased frames given from the increased frame number calculation unit 13 without change.

The compression rate control unit 15 determines a new compression rate based on the number of increased frames given from the timing control unit 14, notifies the encoding unit 17 about a compression rate ID corresponding to the new compression rate, and records the new compression rate ID in the compression rate switching history memory 16. The compression rate control unit 15 also updates the penalty by referring to the compression rate switching history memory 16, and notifies the timing control unit 14 about the updated penalty. The penalty is updated in the following manner.

When the new compression rate ID is larger than the penalty compression rate ID, the switching history of the compression rate ID is analyzed. When the current compression rate switching meets conditions for imposing a penalty, the penalty is updated. In this case, the compression rate ID newly determined is set to the penalty compression rate ID.

When the new compression rate ID is smaller than the penalty compression rate ID, the switching history of the compression rate ID is analyzed. When the current compression rate switching meets conditions for canceling the penalty, the penalty is set to a once larger penalty. In this case, the penalty compression rate ID is set to 0.

The encoding unit 17 calculates a new compression rate based on the notification of the compression rate ID given from the compression rate control unit 15. The encoding unit 17 further reads data corresponding to a wireless transmission target (audio data in this embodiment) recorded in the data buffer 18, performs an encoding process at adjusted timing while reflecting the new compression rate, and stores encoded data thus obtained in the encoded data buffer 19. When the encoding unit 17 stores encoded data in the encoded data buffer 19 for a prescribed number of frames allowed to be output to the transmission wait buffer 20 as transmission encoded data, the encoding unit 17 generates transmission encoded data from the encoded data for the prescribed number of stored frames, and outputs the generated transmission encoded data to the transmission wait buffer 20.

The compression rate is calculated by the encoding unit 17 in the following manner.

When the compression rate ID given from the compression rate control unit 15 indicates switching for increasing the compression rate in a state that encoded data has been already stored in the encoded data buffer 19 (for example, in case of transition from FIG. 1A to FIG. 1B), the compression rate is calculated based on the data size and the number of frames of the encoded data stored in the encoded data buffer 19, the transmission capacity of transmission encoded data, and the number of stored frames. When the compression rate ID is switched from 0 to 2 in a state that encoded data of one frame is stored in the encoded data buffer 19, for example, the number of stored frames is switched from 2 to 4. In this case, a temporary compression rate is established such that the transmission capacity of transmission encoded data is filled with the encoded data of one frame already existing, and encoded data of three frames newly encoded. At the timing of a subsequent empty state of the encoded data buffer 19, a prescribed compression rate at the compression rate ID=2 (compression rate allowing constitution of one transmission encoded data by encoded data of the number of stored frames (4 for compression rate ID=2)) is determined.

When the notification of the compression rate ID given from the compression rate control unit 15 indicates switching for increasing the compression rate in the empty state of the encoded data buffer 19 (in case of transition from FIG. 1B to FIG. 1C, for example), the compression rate is calculated such that a default compression rate is set for the compression rate ID.

When the notification of the compression rate ID given from the compression rate control unit 15 indicates switching for decreasing the compression rate (in case of transition from FIG. 1C to FIG. 1A, for example), a default compression rate is set for a new compression rate ID at the timing of the empty state of the encoded data buffer 19.

It is assumed that the size and the number of frames of the encoded data stored in the encoded data buffer 19 are appropriately managed by the encoding unit 17.

The transmission wait buffer 20 is a FIFO memory which retains transmission encoded data input from the encoding unit 17, and outputs retained transmission wait data to the communication processing unit 21 one by one in the order of input such that the first input data is output first when the communication processing unit 21 lies in a state capable of receiving transmission wait data. When the transmission encoded data output to the communication processing unit 21 is successfully transmitted by wireless transmission, the transmission wait buffer 20 updates the transmission encoded data by deletion or other methods.

The communication processing unit 21 performs processes corresponding to respective layers of link manager, baseband, and RF, for example, for the transmission encoded data input from the transmission wait buffer 20, and outputs the processed transmission encoded data to the wireless communication unit 22 as baseband packets allowed to be transmitted wirelessly. The wireless communication unit 22 receives baseband packets including a Bluetooth module, for example, and input from the communication processing unit 21, and wirelessly transmits the baseband packets to the receiving side.

Data Transmission Process by Transmission Device 10

Figure 4:
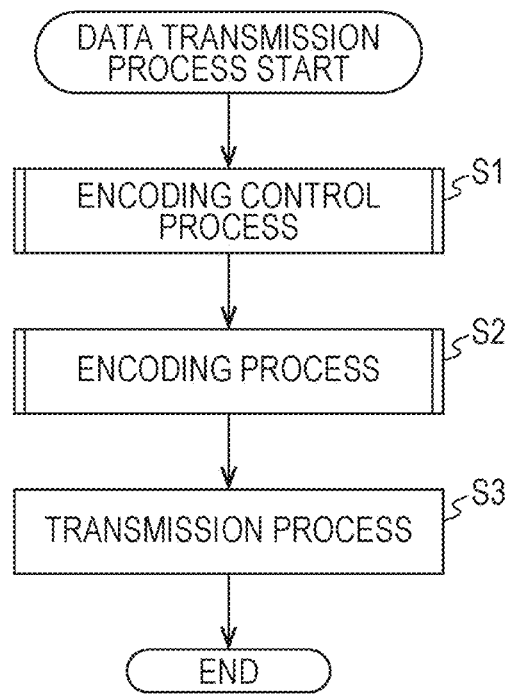
FIG. 4 is a flowchart describing a data transmission process.

FIG. 4 is a flowchart illustrating a data transmission process performed by the transmission device 10.

This data transmission process is repeatedly performed by the control unit 11 at intervals of 20 milliseconds. It is assumed that respective memories, respective buffers, respective parameters and others are initialized before a start of the data transmission process.

The data transmission process includes an encoding control process in step S1, an encoding process in step S2, and a transmission process in step S3.

In the encoding control process in step S1, the presence or absence of switching of a compression rate is determined. A compression rate in the encoding process is further determined based on the result of this determination. In the encoding process in step S2, an encoding process is performed for data at the compression rate determined in the encoding control process in step S1. Transmission encoded data is further generated as data including encoded data for the number of stored frames corresponding to a compression rate ID. In the transmission process in step S3, the transmission encoded data is packetized, and wirelessly transmitted to the receiving side. The encoding control process and the encoding process are detailed below.

Figure 5:
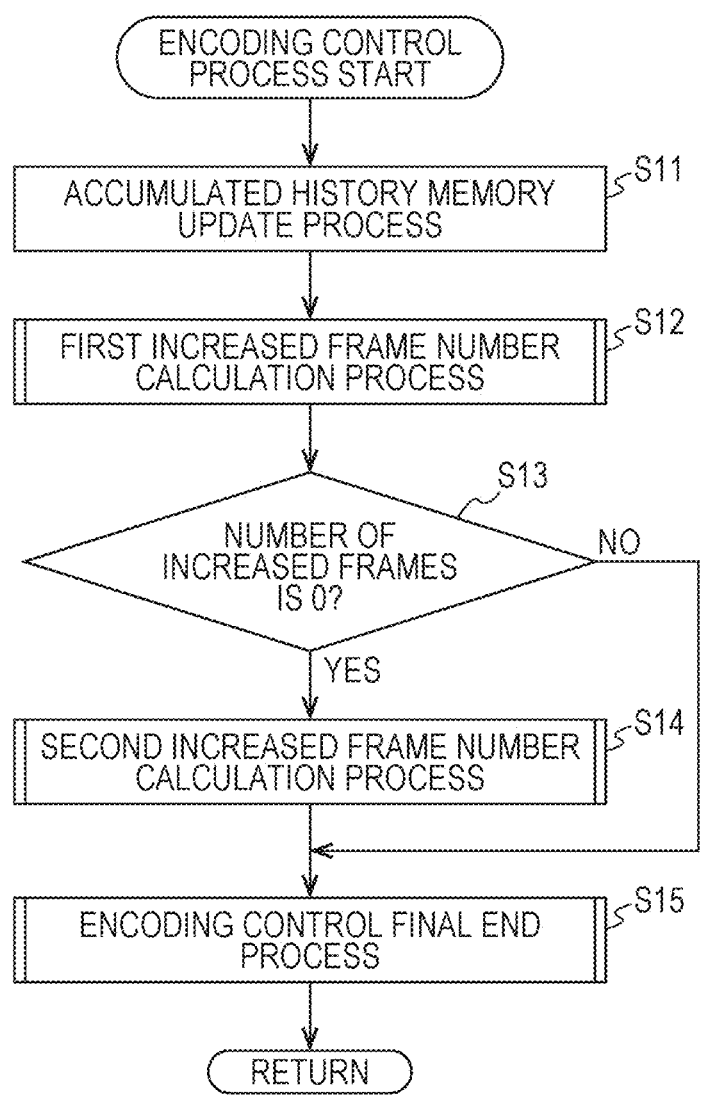
FIG. 5 is a flowchart detailing an encoding control process.

FIG. 5 is a flowchart detailing the encoding control process performed in step S1 in FIG. 4.

In step S11, an accumulated history memory update process is performed by the accumulated history memory update unit 12. More specifically, the number of increased frames is initialized to 0 by the increased frame number calculation unit 13, whereafter the number of transmission wait data is stored in the accumulated history memory 24 in response to turning-on of the switch 23 by the accumulated history memory update unit 12. When the whole capacity of the accumulated history memory 24 is full, the latest number of transmission wait data is stored after discard of the oldest record. Simultaneously, the sum total of the number of transmission wait data stored in the accumulated history memory 24 is updated.

In step S12, the increased frame number calculation unit 13 performs a first increased frame number calculation process. The first increased frame number calculation process compares the number of transmission wait data with a skipping danger threshold corresponding to the current compression rate ID. When increase in the compression rate is determined based on the comparison result, the number of increased frames is switched. The first increased frame number calculation process is detailed below with reference to FIG. 6.

In step S13, the control unit 11 determines whether or not the number of increased frames has been set to 0 by the first increased frame number calculation process in step S12. When the determination result is true, the process proceeds to step S14. In contrast, when the determination result is false, however, the process skips step S14.

In step S14, the increased frame number calculation unit 13 performs a second increased frame number calculation process. More specifically, the second increased frame number calculation process is a determination process performed when a prescribed number of histories are accumulated in the accumulated history memory 24. When histories for the compression rate decrease observation time are accumulated in the accumulated history memory 24, for example, a process for determining whether to decrease the compression rate, or like processes are performed. The number of increased frames is set based on the result of this determination. The second increased frame number calculation process is detailed below with reference to FIG. 7.

In step S15, the compression rate control unit 15 performs an encoding control final end process for updating the compression rate ID, a penalty and the like in accordance with the set number of increased frames. The encoding control final end process is detailed below with reference to FIG. 8.

Figure 6:
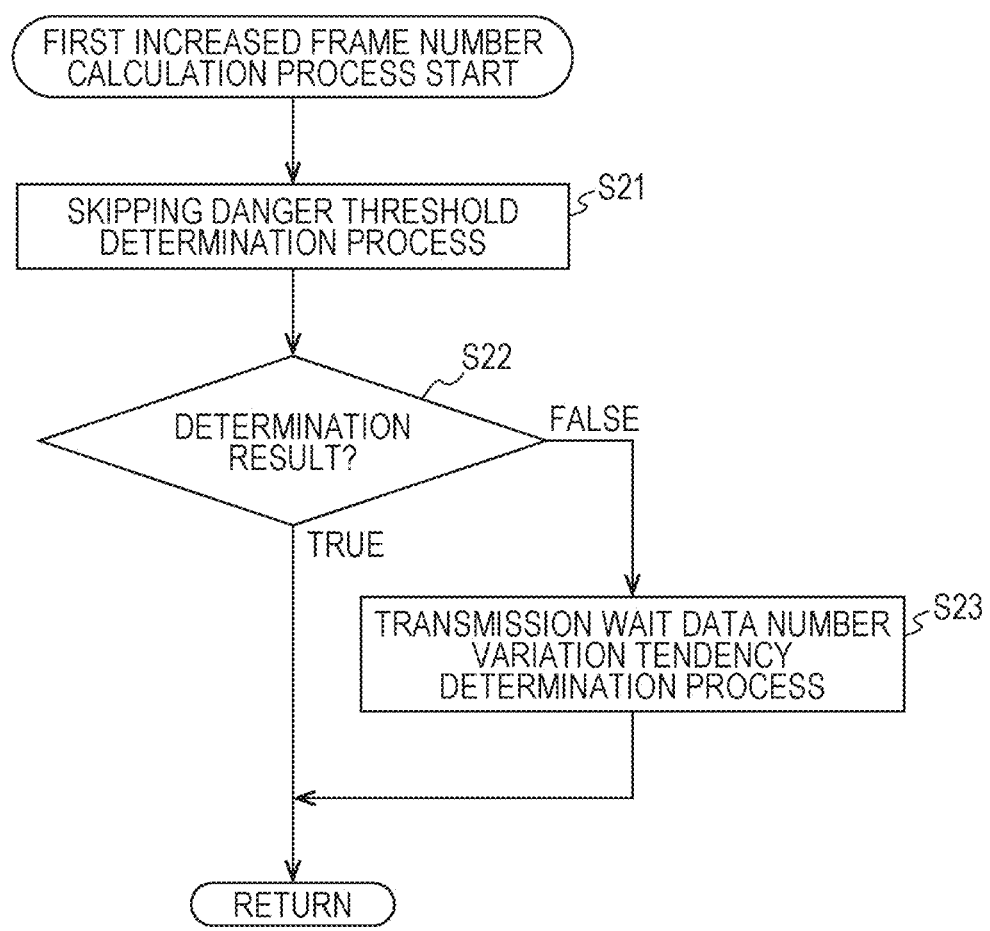
FIG. 6 is a flowchart detailing a first increased frame number calculation process.

FIG. 6 is a flowchart detailing the first increased frame number calculation process performed in step S12 in FIG. 5.

In step S21, a skipping danger threshold determination process is performed to determine whether or not the latest value of the accumulated history memory 24 (number of transmission wait data) exceeds a skipping danger threshold corresponding to the current compression rate ID. When the number of transmission wait data exceeds the skipping danger threshold corresponding to the current compression rate ID, the number of increased frames is calculated and set. In step S22, it is determined whether the determination result of the skipping danger threshold determination process in step S21 is true or false. When the determination result in step S22 is true (when the number of transmission wait data exceeds the skipping danger threshold), the process leaves the first increased frame number calculation process, and proceeds to step S13 in FIG. 5. In contrast, when the determination result in step S22 is false (when the number of transmission wait data does not exceed the skipping danger threshold), however, the process proceeds to step S23.

In step S23, a transmission wait data number variation tendency determination process is performed. More specifically, values accumulated in the accumulated history memory 24 are analyzed to determine whether or not the number of transmission wait data has a tendency of gradual increase. When the current value is larger than the previous value, and exceeds a predetermined threshold (such as 4), for example, the determination result is true. In the opposite case, the determination result is false. The number of increased frames is calculated only when the determination result is true. After this determination, the process leaves the first increased frame umber calculation process, and proceeds to step S13 in FIG. 5.

Figure 7:
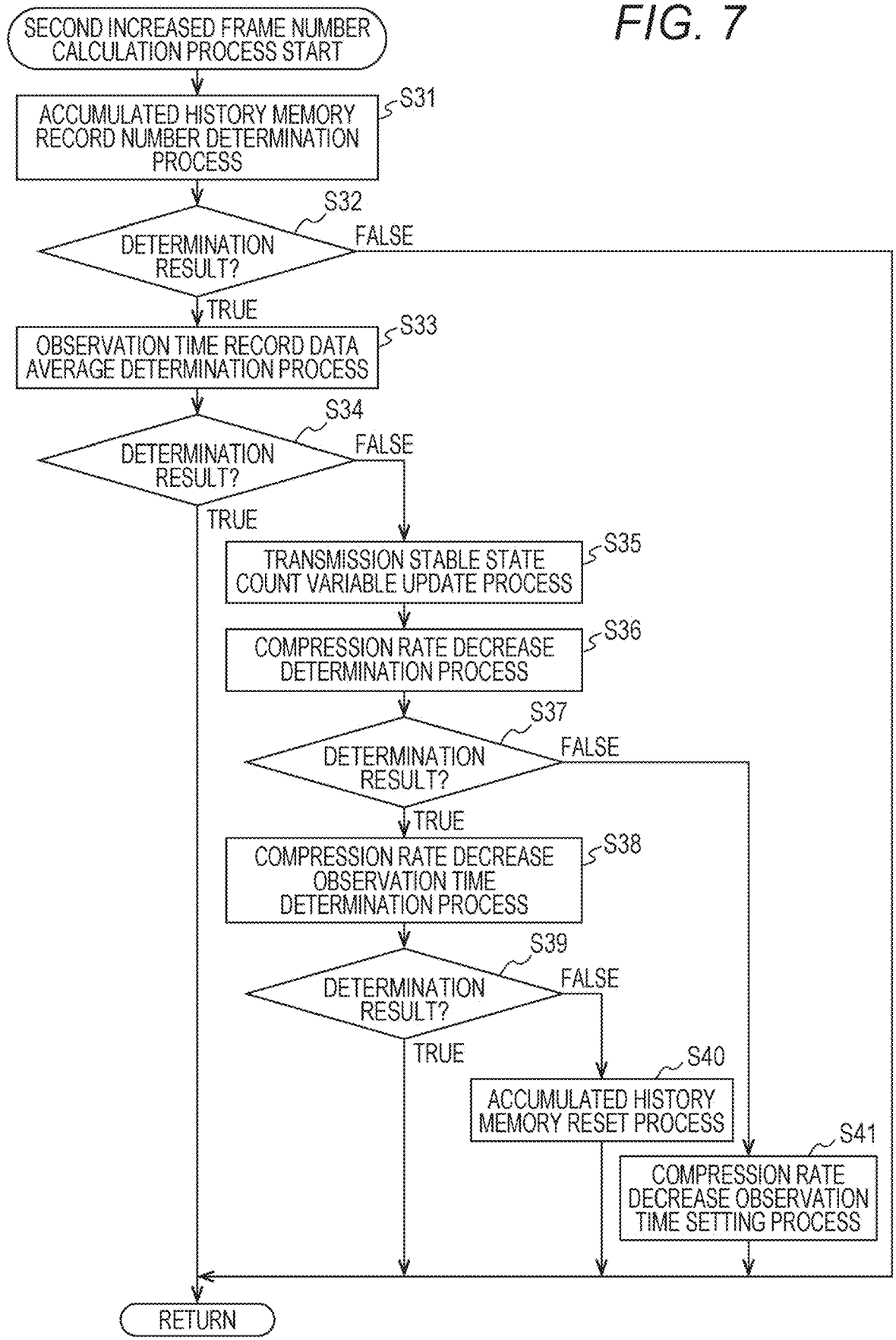
FIG. 7 is a flowchart detailing a second increased frame number calculation process.

FIG. 7 is a flowchart detailing the second increased frame number calculation process in step S14 in FIG. 6.

In step S31, an accumulated history memory record number determination process is performed to determine whether or not a prescribed number of histories (25 (=500/ 20) histories for a record of 500 milliseconds based on checking of the number of transmission wait data at intervals of 20 milliseconds) have been accumulated in the accumulated history memory 24. In step S32, it is determined whether the determination result of the accumulated history memory record number determination process in step S31 is true or false. When the determination result is false in step S32 (prescribed number of histories are not accumulated in the accumulated history memory 24), the process leaves the second increased frame number calculation process, and proceeds to step S15 in FIG. 5. In contrast, when the determination result is true in step S32 (prescribed number of histories are accumulated in the accumulated history memory 24), however, the process proceeds to step S33.

In step S33, the average of records (the numbers of transmission wait data) in the accumulated history memory 24 is calculated after the number of the records reaches a prescribed number. An observation time record data average determination process is performed to determine whether or not this average exceeds a predetermined threshold (such as 1.5).

In step S34, it is determined whether the determination result of the observation time record data average determination process in step S33 is true or false. When the determination result is true in step S34 (when the average of the numbers of accumulated transmission encoded data exceeds the threshold), the number of increased frames is set to 1 to increase the compression rate, for example. Then, the process leaves the second increased frame number calculation process, and proceeds to step S15 in FIG. 5. In contrast, when the determination result is false in step S34 (the average of the numbers of accumulated transmission encoded data does not exceed the threshold), however, the process proceeds to step S35.

In step S35, a transmission stable state count variable update process is performed to update a transmission stable state count variable indicating the number of times of continuation of a state unnecessary to increase in the compression rate. More specifically, 1 is only added to the transmission stable state count variable, for example. The transmission stable state count variable indicates a time elapsed after update of the compression rate, and referred to at the time of update of a penalty.

In step S36, histories in the accumulated history memory 24 are analyzed. A compression rate decrease determination process is performed to determine whether or not the analysis result meets conditions for decreasing the compression rate (values recorded in the accumulated history memory 24 (number of transmission wait data) are all 0, for example). Instep S37, it is determined whether the determination result of the compression rate decrease determination process in step S36 is true or false. When the determination result is true in step S37 (conditions for decreasing the compression rate are met), it is determined that decreasing the compression rate is allowed. In this case, the process proceeds to step S38.

In step S38, a compression rate decrease observation time determination process is performed based on the result of analysis of the histories in the accumulated history memory 24 to determine whether or not a period meeting conditions for decreasing the compression rate continues for a compression rate decrease observation time reflecting a penalty.

More specifically, the number of times of the compression rate decrease observation time determination process necessary to be continuously performed is set to a variable "compression rate decrease application flag" beforehand for the necessary compression rate decrease observation time. When a calculated value becomes 0 or smaller after subtraction of 1 from the compression rate decrease application flag, the determination result is true. Based on this "true" determination, −1 is set to the number of increased frames to practically decrease the compression rate. When the determination is false, the number of increased frames is not updated.

When a period of 500 milliseconds is determined as a reference prescribed number in the accumulated history memory record number determination process in step S31, for example, the compression rate decrease observation time becomes 5 seconds at the current compression rate ID set to 1 (see FIG. 2). Assuming that the penalty is set to a once larger penalty, the number of times of the compression rate decrease observation time determination process necessary to be continuously performed is ten times. More specifically, 10 is set to the compression rate decrease application flag at prescribed timing such as at the time of initialization. In this case, 1 is subtracted from the compression rate decrease application flag every time the compression rate decrease observation time determination process is performed. When the compression rate decrease application flag becomes 0 or smaller, −1 is set to the number of increased frames.

In subsequent step S39, it is determined whether the determination result of the compression rate decrease observation time determination process is true or false in step S38. When it is determined that the determination result is true in step S39, the process leaves the second increased frame number calculation process, and proceeds to step S15 in FIG. 5.

When the determination result is false in step S39, the process proceeds to step S40. In step S40, an accumulated history memory reset process is performed to delete all records accumulated in the accumulated history memory 24. Then, the process leaves the second increased frame number calculation process, and proceeds to step S15 in FIG. 5.

When the determination result is false in step S37, it is determined that decrease in the compression rate is not allowed. In this case, the process proceeds to step S41. In step S41, a compression rate decrease observation time setting process is performed to set the number of times calculated based on the compression rate decrease observation time and the penalty corresponding to the current compression ID to the compression rate decrease application flag used in the compression rate decrease observation time determination process in step S38. Then, the process leaves the second increased frame number calculation process, and proceeds to step S15 in FIG. 5.

Figure 8:
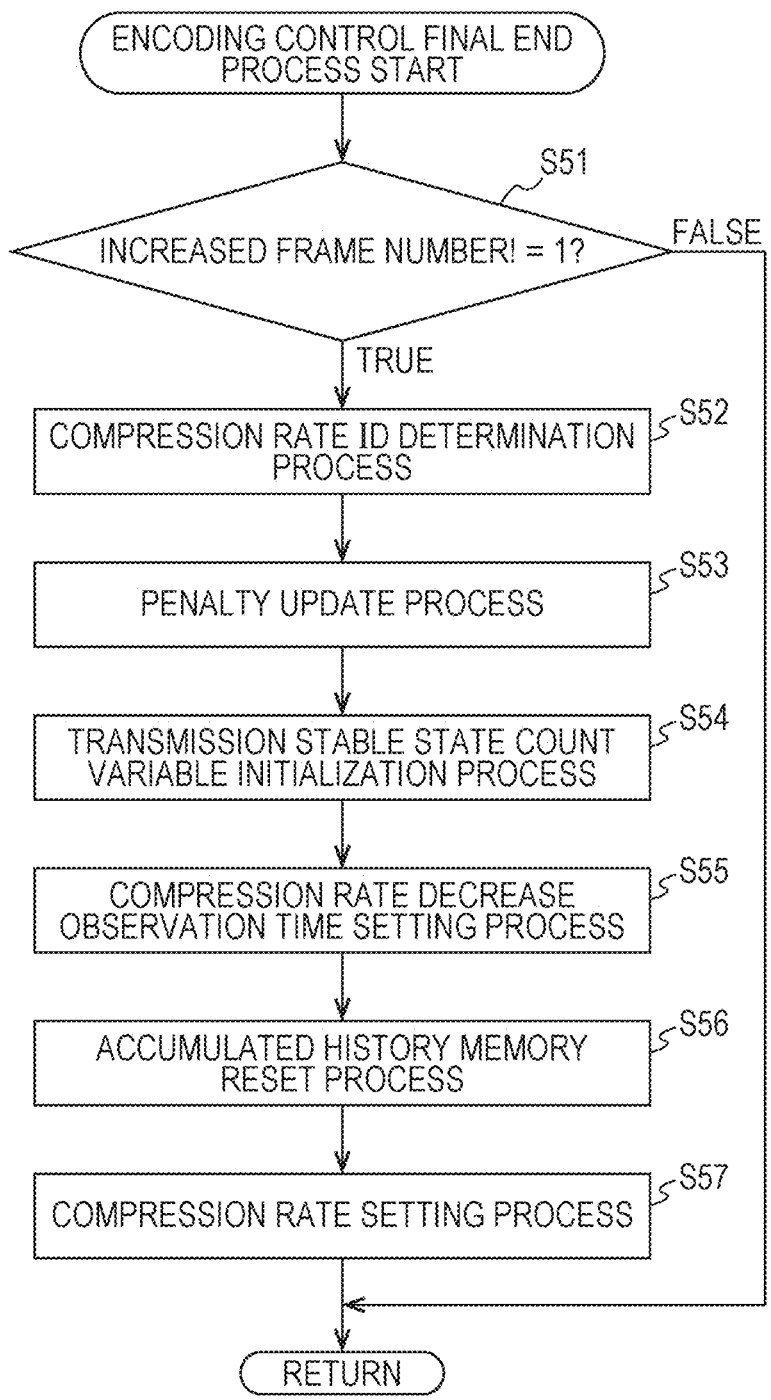
FIG. 8 is a flowchart detailing an encoding control final end process.

FIG. 8 is a flowchart detailing the encoding control final end process performed in step S15 in FIG. 5.

In step S51, it is determined whether or not the set number of increased frames is other than 0. When it is determined that the number of increased frames is 0, the process leaves the encoding control final end process, and proceeds to step S2 in FIG. 4. When it is determined that the number of increased frames is other than 0, the process proceeds to step S52.

In step S52, the compression rate control unit 15 performs a compression rate ID determination process for calculating a new compression rate ID based on the number of stored frames corresponding to the current compression rate ID, and the number of increased frames. When the current compression rate ID is 1 (corresponding number of stored frames: 3) in a state that the number of increased frames is set to 2, for example, the following number of stored frames becomes 5. In this case, 3 is determined as the new compression rate ID in correspondence with the number of stored frames (=5) (see FIG. 2).

In step S53, the compression rate control unit 15 performs a penalty update process for calculating a penalty based on the compression rate ID determined in step S52.

In step S54, a transmission stable state count variable initialization process is performed to initialize a transmission stable state count variable to 0, for example.

In step S55, a compression rate decrease observation time setting process is performed to multiply the compression rate decrease observation time corresponding to the compression rate ID determined in step S52 by the penalty updated in step S53, and set the number of times calculated based on the time corresponding to the multiplication result to the compression rate decrease application flag.

In step S56, an accumulated history memory reset process similar to the process in step S40 in FIG. 7 described above is performed. In step S57, the compression rate control unit 15 performs a compression rate setting process to notify the encoding unit 17 about the compression rate ID determined in step S52. Then, the process leaves the encoding control final end process, and proceeds to step S2 in FIG. 4.

Figure 9:
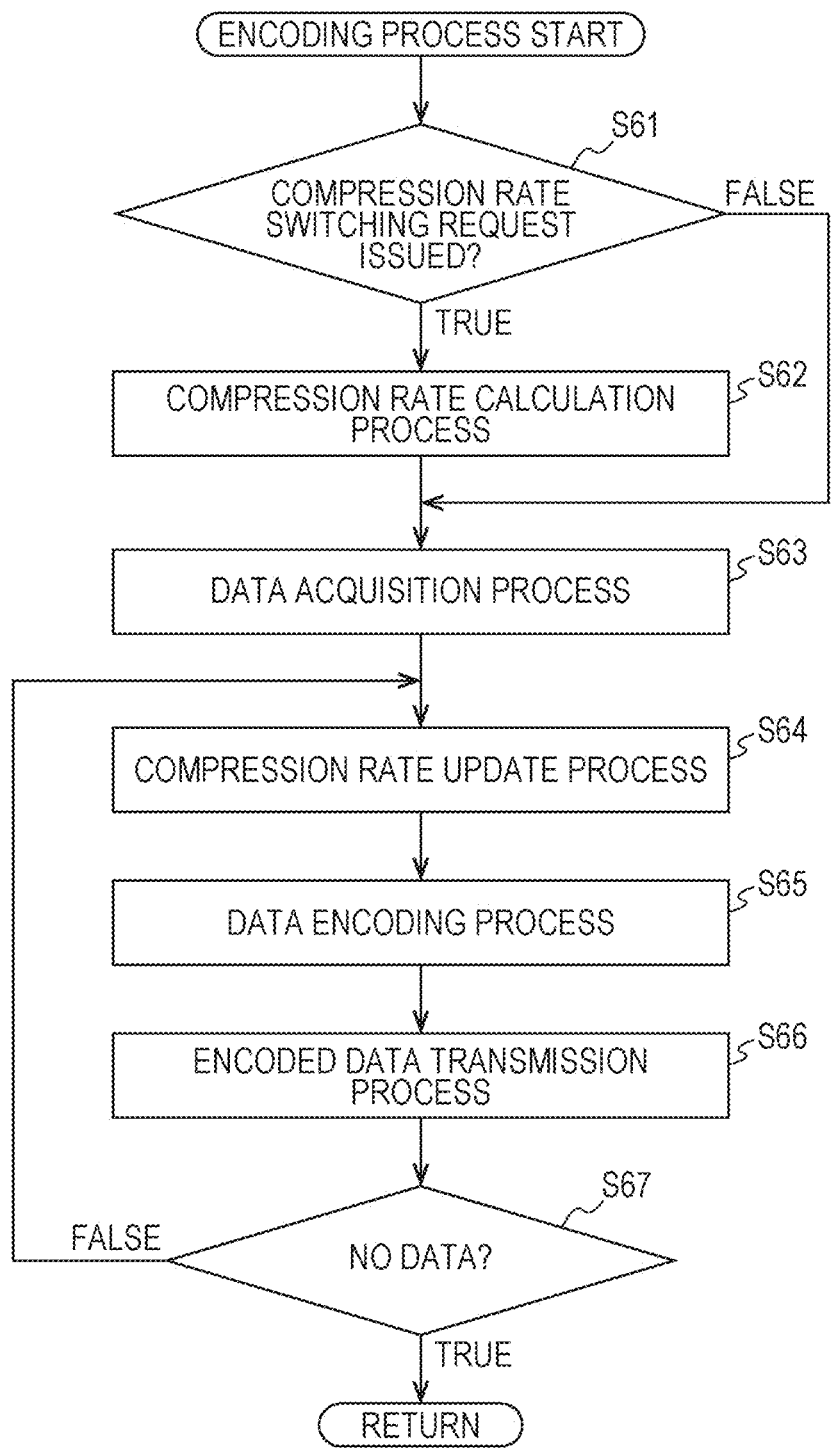
FIG. 9 is a flowchart detailing an encoding process.

FIG. 9 is a flowchart detailing the encoding process performed in step S2 in FIG. 4.

It is assumed that the compression rate ID determined in the encoding control process in step S1 previously performed is given to the encoding process as a compression rate switching request at the time of a start of the encoding process.

It is further assumed in the encoding process that two types of compression rates (first and second compression rates) are calculated. The first compression rate is a compression adopted to promptly respond to the compression rate switching request. The second compression rate is a compression rate adopted at break timing of units of transmission (subsequent packet), i.e., at the timing of a subsequent empty state of the encoded data buffer 19 after the compression rate switching request. The first and second compression rates set to −1 are treated as invalid values. It is assumed that the first and second compression rates are set to invalid values (−1) when the encoding process is initiated.

In step S61, the encoding unit 17 determines whether or not a compression rate switching request has been issued in the previous encoding control process. When it is determined that the compression rate switching request has been issued, the process proceeds to step S62. In contrast, when it is determined that the compression rate switching request has not been issued, however, the process skips step S62, and proceeds to step S63.

In step S62, the encoding unit 17 performs a compression rate calculation process for calculating a compression rate corresponding to the compression rate switching request. When the requested compression rate ID is smaller than the current compression rate ID, i.e., in case of decrease in the compression rate, for example, the first compression rate is set to an invalid value. In this case, the second compression rate is set to a default compression rate corresponding to the requested compression rate ID. In contrast, when the requested compression rate ID is larger than the current compression rate ID, i.e., in case of increase in the compression rate, the first compression rate is calculated and set based on the number of stored frames corresponding to the requested compression rate ID, the data size and the number of frames of encoded data already retained in the encoded data buffer 19, and the remaining data capacity allowed to be stored in the transmission capacity of the packets. However, when the calculated first compression rate is out of the application range of the adopted encoding system, the first compression rate is set to an invalid value. The second compression rate is set to a default compression rate corresponding to the requested compression rate ID.

In step S63, the encoding unit 17 performs a data acquisition process for acquiring data corresponding to a target of the encoding process from the data buffer 18. Concerning the data volume to be acquired, audio data for reproduction time of 20 milliseconds is acquired based on a state that a data transmission process is executed for every 20 milliseconds when the data corresponding to the target of the encoding process is audio data, for example.

In step S64, the encoding unit 17 performs a compression rate update process for setting a compression rate adopted when the acquired data is encoded. More specifically, it is initially checked whether or not the first compression rate is an invalid value. When it is confirmed that the first compression rate is not an invalid value, the first compression rate is promptly applied to the encoding system. Then, the first compression rate is set to an invalid value. In contrast, when it is confirmed that the first compression rate is an invalid value, the second compression rate is applied to the encoding system in a state that the second compression rate is not an invalid value, and that no encoded data remains in the encoded data buffer 19, i.e., at the timing when the encoded data buffer 19 becomes empty. Then, the second compression rate is set to an invalid value. When the foregoing conditions are not met, the compression rate is not switched.

In step S65, the encoding unit 17 performs an encoding process for the data acquired in step S63 at the first or second compression rate applied in step S64, or the previous compression rate not switched. Then, the encoding unit 17 performs a data encoding process to record encoded data obtained by the encoding process in the encoded data buffer 19.

In step S66, the encoding unit 17 performs an encoded data transmission process to generate transmission encoded data including encoded data of a prescribed number of frames recorded in the encoded data buffer 19, and outputs the generated transmission encoded data to the transmission wait buffer 20.

In step S67, the encoding unit 17 determines whether or not there remains data not subjected to the encoding process in the data acquired from the data buffer 18. When it is determined that there remains data not subjected to the encoding process, the process returns to step S64, and repeats the processes after step S64. When it is determined that there is no data not subjected to the encoding process, the process leaves the encoding process, and proceeds to step S3 in FIG. 4.

In step S3, the communication processing unit 21 and the wireless communication unit 22 perform the transmission process described above. This is all the description about the data transmission process.

Transition of Compression Rate of Transmission Device 10

A transition of a compression rate of the transmission device 10 is hereinafter described with reference to FIGS. 10 and 11.

Figure 10:
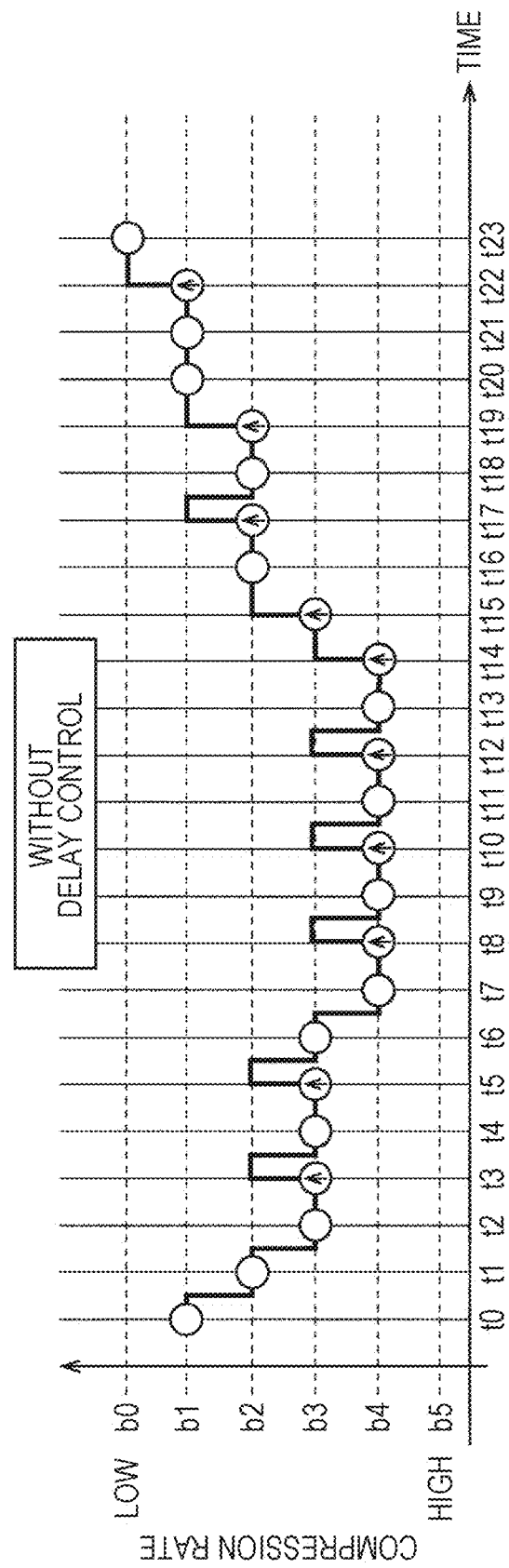
FIG. 10 is a view illustrating a transition of a compression rate without delay control.

FIG. 10 illustrates a transition of a compression rate when the compression rate is updated (without delay control for decreasing the compression rate) based only on the latest number of transmission wait data intermittently checked. FIG. 11 illustrates a transition when the compression rate is updated (with delay control for decreasing the compression rate) based on not only the latest number of transmission wait data intermittently checked, but also an analysis result of the compression switch history.

Figure 11:
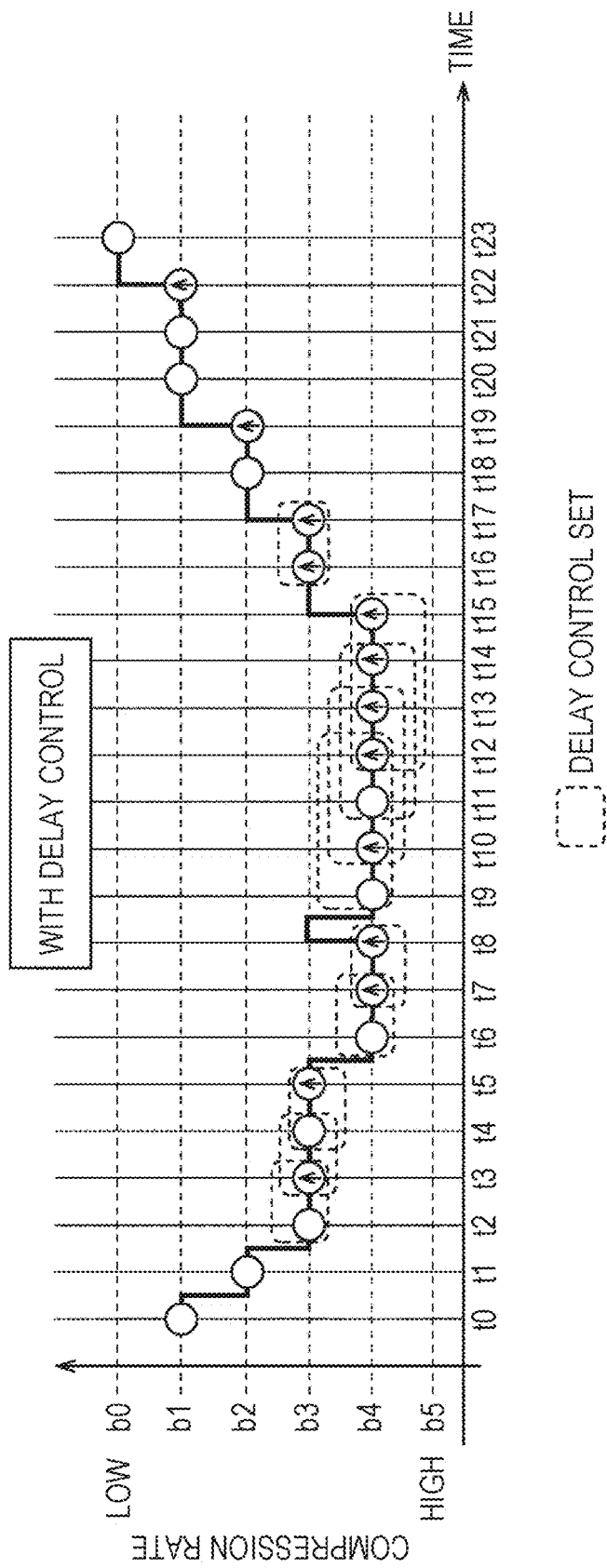
FIG. 11 is a view illustrating a transition of a compression rate with delay control.

In FIGS. 10 and 11, the vertical axis indicates the compression rate. The compression rate decreases toward the b0 side, and increases toward the b5 side. The horizontal line indicates time. A solid line indicates a transition of the compression rate. A circle indicates control determination timing for decreasing the compression rate, corresponding to the timing when the number of transmission wait data for a certain period is stored in the accumulated history memory 24.

In this case, checking of the number of transmission wait data is performed a plurality of times between each circle. The control for increasing the compression rate is performed at this checking timing. While the circles are positioned at equal intervals to simplify the depictions in FIGS. 10 and 11, the respective intervals are adjusted in accordance with the compression rate.

According to the delay control illustrated in FIG. 11, the determination timing for decreasing the compression rate is unified in stages, such as determinations twice and four times, to elongate the observation time necessary for decreasing the compression rate and thereby delay the determination timing. Each dotted line in FIG. 11 indicates a unified range of determination timing. The determination timing for decreasing the compression rate may be unified by increasing the determination time in stages, such as five seconds and ten seconds, as well as by the method described above for exponentially increasing the number of times of the determination timing to twice or four times. The unified determination timing is cancelled in stages.

Initially, a case for decreasing the compression rate without delay control illustrated in FIG. 10 is hereinafter described. A compression rate at a time t0 was b1. However, a compression rate was b2 at a time t1 as a result of determination for increasing the compression rate by one level after the time t0. A compression rate was b3 at a time t2 as a result of determination for increasing the compression rate by one level after the time t1. Conditions for switching the compression rate were not met at this time, wherefore the compression rate was not switched.

At a time t3, conditions for decreasing the compression rate were met based on analysis of a state between the times t2 and t3, wherefore the compression rate was switched to b2. At a time t4, a compression rate was b3 as a result of determination for increasing the compression rate by one level after the time t3. Conditions for switching the compression rate were not met at this time, wherefore the compression rate was not switched.

At a time t5, conditions for decreasing the compression rate were met based on analysis of a state between the times t4 and t5, wherefore the compression rate was switched to b2. At a time t6, a compression rate was b3 as a result of determination for increasing the compression rate by one level after the time t5. Conditions for switching the compression rate were not met at this time, wherefore the compression rate was not switched.

At a time t7, a compression rate was b4 as a result of determination for increasing the compression rate by one level after the time t6. Conditions for switching the compression rate were not met at this time, wherefore the compression rate was not switched. At a time t8, conditions for decreasing the compression rate were met based on analysis of a state between the times t7 and t8, wherefore the compression rate was switched to b3.

Subsequent times t9, t11, and t13 were similar to the time t7, while times t10, t12, and t14 changed similarly to the time t8. Accordingly, an unstable state of the compression rate continued. The transmission state improved after a time t14, wherefore the compression rate decreased even in an unstable manner. At a time t23, the compression rate reached b0.

It is therefore apparent that the compression rate changes in an unstable manner (frequently fluctuates) without delay control for decreasing the compression rate as illustrated in FIG. 10.

A case for decreasing the compression rate with delay control illustrated in FIG. 11 is hereinafter described. A compression rate at a time t0 was b1. However, a compression rate was b2 at a time t1 as a result of determination for increasing the compression rate by one level after the time t0.

A compression rate was b3 at a time t2 as a result of determination for increasing the compression rate by one level after the time t1. Conditions for switching the compression rate were not met at this time, wherefore the compression rate was not switched. A switch pattern for continuously increasing the compression rate twice is applicable to a switch pattern corresponding to delay control, wherefore delay control was effective at this time. The subsequent determination for decreasing the compression rate was limited only to a case when conditions are continuously met twice. A penalty compression rate was set to b3.

At a time t3, conditions for decreasing the compression rate were met based on analysis of a state between the times t2 and t3. However, the compression rate was not switched under the delay control in consideration of the determination result at the time t2. At a time t4, conditions for decreasing the compression rate were not met based on analysis of a state between the times t3 and t4, wherefore the compression rate was not switched.

Conditions for increasing the compression rate were met at a time t5, but not met at the time t4. Accordingly, the compression rate was not switched. At a time t6, a compression rate was b3 as a result of determination for increasing the compression rate by one level after the time t5. Conditions for switching the compression rate were not met at this time, wherefore the compression rate was not switched.

At a time t7, conditions for decreasing the compression rate were met based on analysis of a state between the times t6 and t7. However, the compression rate was not switched under the delay control in consideration of the determination result at the time t6. At a time t8, conditions for decreasing the compression rate were met based on analysis of a state between the times t7 and t8, and further inconsideration of the determination result indicating decrease in the compression rate at the time t7 under the delay control. Accordingly, the compression rate was decreased to b3.

At a time t9, the compression rate was b4 as a result of determination for increasing the compression rate by one level after the time t8. Conditions for switching the compression rate were not met at this time, wherefore the compression rate was not switched. In addition, the state of the compression rate increased immediately after the decrease is applicable to a pattern of the delay control.

Accordingly, delay is raised by one level such that decrease in the compression rate is limited only when determination for four times meets conditions. The compression rate b4 at this time is higher than the compression rate b3 corresponding to the current penalty compression rate. Accordingly, the penalty compression rate was updated to b4.

In a period from t9 to t11, switching of the compression rate is limited under the delay control. At a time t12, conditions for decreasing the compression rate were met based on analysis of a state between the times t11 and t12. However, the compression rate was not switched under the delay control based on the determination results in sections from t9 to t11. Times t13 and t14 were similar to the time t12.

At a time t15, the conditions are continuously met for four times in sections from t12 to t15, wherefore the compression rate was switched to b3 based on the determination for decreasing the compression rate. At a time t16, the conditions for decreasing the compression rate were met based on analysis of a state between the times t15 and t16. However, the compression rate was not switched under the delay control. At a time t17, the conditions for decreasing the compression rate were met both in the sections t16 and t17. The compression rate was stabilized until the time t17, wherefore stabilization was determined at a compression rate lower than the penalty compression rate. In this case, the delay control was lowered by one level such that the compression rate decreases when determination for twice meets the conditions. Accordingly, the compression rate was decreased by one level to b2 based on the determination results of t16 and t17 for twice. The penalty compression rate was updated from b4 to b3.

At a time t18, the conditions for decreasing the compression rate were not met based on an analysis result of a state between the times t17 and t18. Accordingly, the compression rate was not switched.

At a time t19, the compression rates at the times t18 and t19 were stabilized, wherefore the conditions for decreasing the compression rate were met. In addition, stability was determined at a compression rate lower than the penalty compression rate based on the stable state of the compression rate up to the time t19. Accordingly, the delay control was lowered by one level to cancel all of the delay control. With the cancellation of the limitation, the compression rate decrease conditions at the time t19 were effective, wherefore the compression rate was decreased to b1. The penalty compression rate was initialized to b0. for example.

After this stage, transmission wait data were not accumulated in the transmission wait buffer 20. Accordingly, the compression rate was gradually decreased and reached b0 at a time t23.

As apparent from a comparison between FIGS. 10 and 11, the delay control was performed in the period from the time t2 to the time t17 in the case illustrated in FIG. 11. In this case, the control for decreasing the compression rate was limited. Accordingly, it is understood that an effect of stabilizing the compression rate is produced by the delay control.

As described herein, the transmission device 10 according to an embodiment of the present disclosure is capable of wirelessly transmitting data without a break of reproduction on the receiving side. Particularly when audio data is wirelessly transmitted, skipping on the receiving side, and frequent changes of sound quality caused by variations of a compression rate are avoidable.

The data corresponding to wireless transmission of the transmission device 10 is not limited to audio data, but may be arbitrary types of data. For example, the transmission device 10 is applicable to wireless transmission of video data.

The foregoing series of processes may be executed either by hardware or by software. When the series of processes are performed by software, programs included in the software are installed in a computer. Examples of the computer used herein include a computer incorporated in dedicated hardware, and a computer, for example, a general-purpose personal computer, capable of performing various types of functions under various types of programs installed in the computer.

Figure 12:
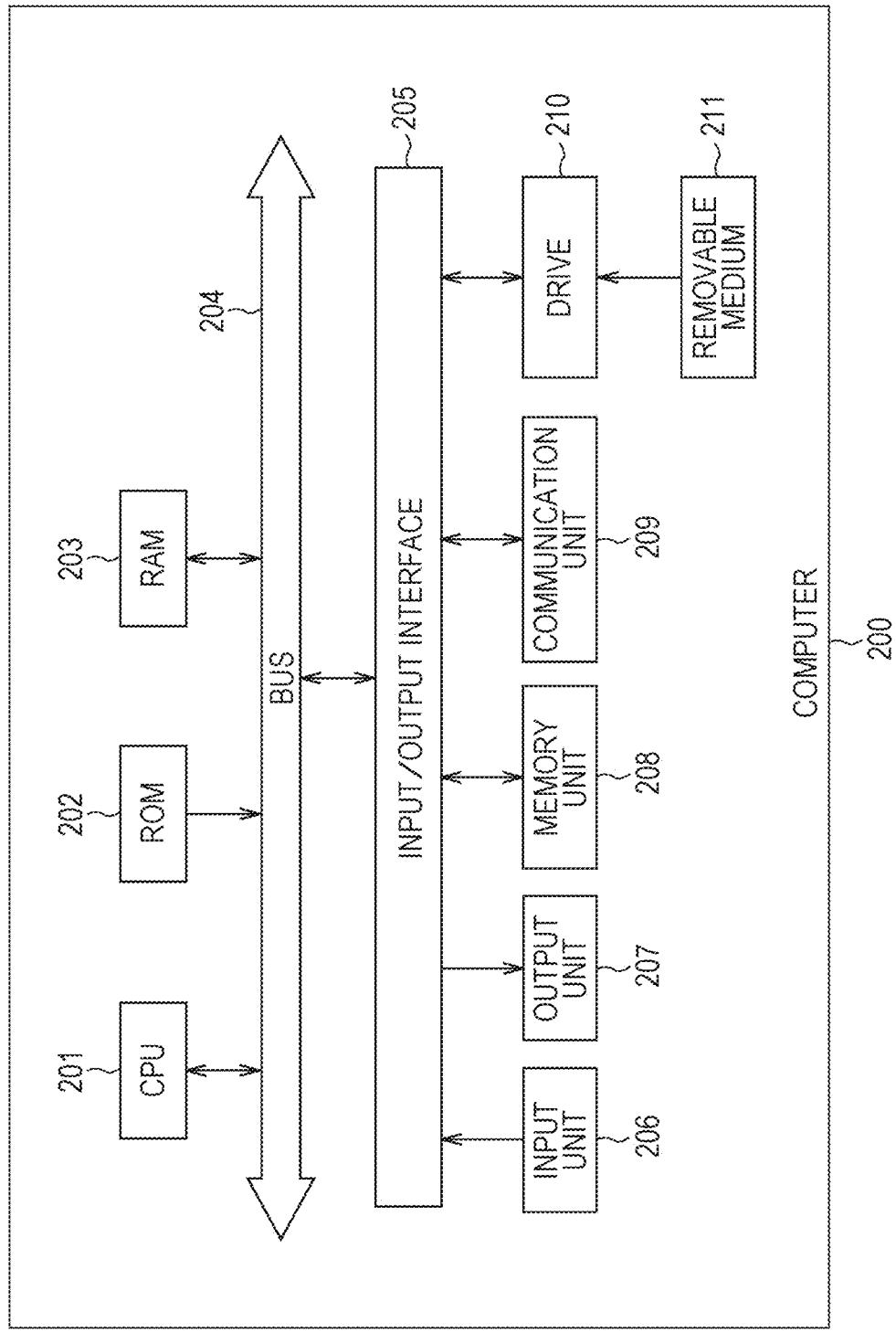
FIG. 12 is a block diagram illustrating a configuration example of a general-purpose computer.

FIG. 12 is a block diagram illustrating a configuration example of hardware included in a computer which executes a series of processes described above under programs.

A Central Processing Unit (CPU) 201, Read Only Memory (ROM) 202, and Random Access Memory (RAM) 203 of the computer are connected to one another via a bus 204.

An input/output interface 205 is further connected with the bus 204. An input unit 206, an output unit 207, a memory unit 208, a communication unit 209, and a drive 210 are connected to the input/output interface 205.

The input unit 206 includes a keyboard, a mouse, a microphone and the like. The output unit 207 includes a display, a speaker and the like. The memory unit 208 includes a hard disk, a non-volatile memory and the like. The communication unit 209 includes a network interface or the like. The drive 210 drives a removable medium 211 such as a magnetic disk, an optical disk, a magneto-optical disk, and a semiconductor memory.

According to the computer 200 constructed as above, the CPU 201 loads programs stored in the memory unit 208 into the RAM 203 via the input/output interface 205 and the bus 204, and executes the programs to perform the series of processes described herein, for example.

The programs executed by the computer 200 may be programs under which the processes are executed in time series in the order described in the present specification, or programs under which the processes are executed in parallel or at necessary timing such as calls.

An embodiment according to an embodiment of the present disclosure is not limited to the embodiment described herein. Various modifications may be made without departing from the subject matters of the present disclosure.

The present disclosure may have the following configurations.

(1)

A transmission device including:

an encoding unit that generates encoded data by performing an encoding process for data corresponding to a wireless transmission target to generate transmission encoded data including the encoded data of a plurality of frames and falling within a unit of transmission in a fixed size;

a retaining unit that temporarily retains the transmission encoded data before wireless transmission;

a transmitting unit that wirelessly transmits the transmission encoded data retained in the retaining unit;

a stored frame number determining unit that determines the number of stored frames indicating the number of frames of the encoded data at the time of generation of the transmission encoded data by the encoding unit based on the number of transmission wait data indicating the number of the transmission encoded data before wireless transmission retained in the retaining unit; and a compression rate determining unit that determines the compression rate adopted in the encoding process based on the determined number of stored frames.

(2)

The transmission device according to (1), further including an accumulating unit that intermittently acquires and accumulates the number of transmission wait data, wherein the stored frame number determining unit determines the number of stored frames based on the number of transmission wait data accumulated in the accumulating unit.

(3)

The transmission device according to (2), wherein the stored frame number determining unit increases the number of stored frames when the latest number of transmission wait data accumulated in the accumulating unit exceeds a predetermined threshold, and the compression rate determining unit increases the compression rate adopted in the encoding process based on the increased number of stored frames.

(4)

The transmission device according to (2) or (3), wherein the encoding unit generates the transmission encoded data containing a mixture of the encoded data having different compression rates for each frame unit in the encoding process when the encoded data subjected to the encoding process at the compression rate before increase remains without transmission at the time of increase in the compression rate.

(5)

The transmission device according to any one of (2) through (4), wherein the stored frame number determining unit decreases the number of stored frames when a history of the number of transmission wait data accumulated in the accumulating unit in a predetermined observation time meets a predetermined condition, and the compression rate determining unit decreases the compression rate adopted in the encoding process based on the decreased number of stored frames.

(6)

The transmission device according to (5), further including a penalty setting unit that sets a penalty imposed to elongate the predetermined observation time.

(7)

The transmission device according to (6), wherein the penalty setting unit sets or cancels the penalty based on a switching history of the compression rate.

(8)

A transmission method of a transmission device for wireless transmission of data, by the transmission method the transmission device performs:

generating encoded data by performing an encoding process for data corresponding to a wireless transmission target to generate transmission encoded data including the encoded data of a plurality of frames and falling within a unit of transmission in a fixed size;

temporarily retaining the transmission encoded data before wireless transmission;

wirelessly transmitting the retained transmission encoded data; determining the number of stored frames indicating the number of frames of the encoded data at the time of generation of the transmission encoded data based on the number of transmission wait data indicating the number of the retained transmission encoded data before wireless transmission; and determining the compression rate adopted in the encoding process based on the determined number of stored frames.

(9)

A program under which a computer functions as:

an encoding unit that generates encoded data by performing an encoding process for data corresponding to a wireless transmission target to generate transmission encoded data including the encoded data of a plurality of frames and falling within a unit of transmission in a fixed size;

a retaining unit that temporarily retains the transmission encoded data before wireless transmission;

a transmitting unit that wirelessly transmits the transmission encoded data retained in the retaining unit;

a stored frame number determining unit that determines the number of stored frames indicating the number of frames of the encoded data at the time of generation of the transmission encoded data by the encoding unit based on the number of transmission wait data indicating the number of the transmission encoded data before wireless transmission retained in the retaining unit; and a compression rate determining unit that determines the compression rate adopted in the encoding process based on the determined number of stored frames.

(1A)

A device comprising:

a memory buffer configured to temporarily retain encoded data representing a plurality of frames of a time-sequential signal before wireless transmission of the encoded data from the device;

a transmitter configured to wirelessly transmit the encoded data from the memory buffer; and control circuitry configured to:

determine a current number of frames of encoded data stored in the memory buffer and awaiting transmission;

select a compression rate for encoding a next frame of data of the time-sequential signal based on the determined number of stored frames in the memory buffer;

encode the next frame of the time-sequential signal using the selected compression rate; and add the encoded next frame to the encoded data stored in the memory buffer for wireless transmission from the device via the transmitter.

(2A)

The device according to (1A), wherein the control circuitry is configured to intermittently determine an amount of encoded data stored in the memory buffer and determine the current number of frames of encoded data stored in the memory buffer based on the determined amount of encoded data stored in the memory buffer.

(3A)

The device according to claim 1A), wherein the control circuitry is configured to:

determine that the current number of stored frames is increased when the determined amount of encoded data stored in the memory buffer exceeds a predetermined threshold; and increase the compression rate selected for encoding the next frame based on the increased number of stored frames.

(4A)

The device according to (3A), wherein the control circuitry is configured to package the next frame encoded at the increased compression rate in a same transmission packet with a previous frame encoded at a different compression rate that has not yet been transmitted.

(5A)

The device according to (2A), wherein the control circuitry is configured to:

determine that the current number of stored frames is decreased when a history of the amount of encoded data stored in the memory buffer during a predetermined observation time meets a predetermined condition; and decrease the compression rate selected for encoding the next frame based on the decreased number of stored frames.

(6A) The device according to (5A), wherein the control circuitry is further configured to elongate the predetermined observation time based on a detected pattern of compression rate changes.

(7A) The device according to (6A), wherein the control circuitry is configured to set or cancel elongation of the predetermined observation time based on a switching history of the compression rate.

(8A) A method for wireless transmission of data, the method comprising:

encoding data representing a plurality of frames of a time-sequential signal;

temporarily retaining the encoded data in a memory buffer before wireless transmission of the encoded data;

determining a current number of frames of encoded data stored in the memory buffer and awaiting transmission;

selecting a compression rate for encoding a next frame of data of the time-sequential signal based on the determined number of stored frames in the memory buffer;

encoding the next frame of the time-sequential signal using the selected compression rate;

adding the encoded next frame to the encoded data stored in the memory buffer; and wirelessly transmitting the encoded data from the memory buffer.

(9A) At least one non-transitory computer-readable storage medium storing computer-executable instructions that, when executed, perform a method for wireless transmission of data, the method comprising:

encoding data representing a plurality of frames of a time-sequential signal;

temporarily retaining the encoded data in a memory buffer before wireless transmission of the encoded data;

determining a current number of frames of encoded data stored in the memory buffer and awaiting transmission;

selecting a compression rate for encoding a next frame of data of the time-sequential signal based on the determined number of stored frames in the memory buffer;

encoding the next frame of the time-sequential signal using the selected compression rate;

adding the encoded next frame to the encoded data stored in the memory buffer; and wirelessly transmitting the encoded data from the memory buffer.

REFERENCE SIGNS LIST

10 Transmission device
11 Control unit
12 Accumulated history memory update unit
13 Increased frame number calculation unit
14 Timing control unit
15 Compression rate control unit
16 Compression rate switching history memory
17 Encoding unit
18 Data buffer
19 Encoded data buffer
20 Transmission wait buffer
21 Communication processing unit
22 Wireless communication unit
23 Switch
24 Accumulated history memory
200 Computer
201 CPU

The invention claimed is:

1. A device comprising:
a memory buffer configured to temporarily retain encoded data representing a plurality of frames of a time-sequential signal before wireless transmission of the encoded data from the device;
a transmitter configured to wirelessly transmit the encoded data from the memory buffer; and
control circuitry configured to:
intermittently determine an amount of encoded data stored in the memory buffer and determine a current number of frames of encoded data stored in the memory buffer and awaiting transmission based on the determined amount of encoded data stored in the memory buffer;
select a compression rate for encoding a next frame of data of the time-sequential signal based on the determined number of stored frames awaiting transmission in the memory buffer and based on a packet transmission size;
encode the next frame of the time-sequential signal using the selected compression rate; and
add the encoded next frame to the encoded data stored in the memory buffer for wireless transmission from the device via the transmitter.

2. The device according to claim 1, wherein the control circuitry is configured to:
determine that the current number of stored frames is increased when the determined amount of encoded data stored in the memory buffer exceeds a predetermined threshold; and
increase the compression rate selected for encoding the next frame based on the increased number of stored frames.

3. The device according to claim 2, wherein the control circuitry is configured to package the next frame encoded at the increased compression rate in a same transmission packet with a previous frame encoded at a different compression rate that has not yet been transmitted.

4. The device according to claim 1, wherein the control circuitry is configured to:
determine that the current number of stored frames is decreased when a history of the amount of encoded data stored in the memory buffer during a predetermined observation time meets a predetermined condition; and
decrease the compression rate selected for encoding the next frame based on the decreased number of stored frames.

5. The device according to claim 4, wherein the control circuitry is further configured to elongate the predetermined observation time based on a detected pattern of compression rate changes.

6. The device according to claim 5, wherein the control circuitry is configured to set or cancel elongation of the predetermined observation time based on a switching history of the compression rate.

7. The device of claim 1, wherein:
the transmitter is configured to transmit the encoded data using a fixed packet transmission size.

8. The device of claim 1, wherein:
the control circuitry is configured to select the compression rate for encoding the next frame of data Without switching the packet transmission size.

9. A method for wireless transmission of data, the method comprising:
encoding data representing a plurality of frames of a time-sequential signal;
temporarily retaining the encoded data in a memory buffer before wireless transmission of the encoded data;
intermittently determining an amount of encoded data stored in the memory buffer and determining a current number of frames of encoded data stored in the memory buffer and awaiting transmission based on the determined amount of encoded data stored in the memory buffer;
selecting a compression rate for encoding a next frame of data of the time-sequential signal based on the determined number of stored frames in the memory buffer and based on a packet transmission size;
encoding the next frame of the time-sequential signal using the selected compression rate;
adding the encoded next frame to the encoded data stored in the memory buffer; and
wirelessly transmitting the encoded data from the memory buffer.

10. At least one non-transitory computer-readable storage medium storing computer-executable instructions that, when executed, perform a method for wireless transmission of data, the method comprising:
encoding data representing a plurality of frames of a time-sequential signal;
temporarily retaining the encoded data in a memory buffer before wireless transmission of the encoded data;
intermittently determining an amount of encoded data stored in the memory buffer and determining a current number of frames of encoded data stored in the memory buffer and awaiting transmission based on the determined amount of encoded data stored in the memory buffer;
selecting a compression rate for encoding a next frame of data of the time-sequential signal based on the determined number of stored frames awaiting transmission in the memory buffer and based on a packet transmission size;
encoding the next frame of the time-sequential signal using the selected compression rate;
adding the encoded next frame to the encoded data stored in the memory buffer; and
wirelessly transmitting the encoded data from the memory buffer.

* * * * *